(12) United States Patent
Cho

(10) Patent No.: US 8,334,943 B2
(45) Date of Patent: Dec. 18, 2012

(54) LIGHTING DEVICE, DISPLAY DEVICE AND TELEVISION RECEIVER

(75) Inventor: Shiyoshi Cho, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 116 days.

(21) Appl. No.: 13/121,221

(22) PCT Filed: Jun. 19, 2009

(86) PCT No.: PCT/JP2009/061193
§ 371 (c)(1), (2), (4) Date: Apr. 22, 2011

(87) PCT Pub. No.: WO2010/038521
PCT Pub. Date: Apr. 8, 2010

(65) Prior Publication Data
US 2011/0187963 A1    Aug. 4, 2011

(30) Foreign Application Priority Data

Sep. 30, 2008 (JP) .................... 2008-255116

(51) Int. Cl.
*G02F 1/1335* (2006.01)
(52) U.S. Cl. ............... 349/62; 349/63; 349/64; 349/65; 349/66; 349/67
(58) Field of Classification Search ............... 349/62–69
See application file for complete search history.

(56) References Cited

FOREIGN PATENT DOCUMENTS

| JP | 2000-305475 A | 11/2000 |
|----|---------------|---------|
| JP | 2001-93321 A | 4/2001 |

OTHER PUBLICATIONS

Official Communication issued in International Patent Application No. PCT/JP2009/061193, mailed on Sep. 29, 2009.

*Primary Examiner* — Phu Vu
(74) *Attorney, Agent, or Firm* — Keating & Bennett, LLP

(57) ABSTRACT

A backlight unit 12 includes LEDs 16, a first light guide plate 18A, a second light guide plate 18B and a fitting structure. Each of the first light guide plate 18A and the second light guide plate 18B has a light entrance surface 34 and a light exit surface 36. The light entrance surface 34 faces the corresponding LED 16 and light from the LED 16 enters through the light entrance surface 34. The light exit surface 36 through which light exits is arranged along an arrangement direction in which the LED 16 and the light entrance surface 34 are arranged. The light guide plates 18 are arranged in a parallel layout in the arrangement direction and partially overlap in a direction perpendicular to the light exit surface 36. A light exit portion 31 is an overlapping area OA that is provided on the first light guide plate 18A on a relatively light output side. A fitting structure restricts relative movement of the light exit portion 31 toward the light output side with respect to the second light guide plate 18B provided on a side relatively opposite to the light output side. Accordingly, uneven brightness is less likely to occur.

17 Claims, 27 Drawing Sheets

US 8,334,943 B2

LIGHTING DEVICE, DISPLAY DEVICE AND TELEVISION RECEIVER

TECHNICAL FIELD

The present invention relates to a lighting device, a display device and a television receiver.

BACKGROUND ART

In recent years, displays of image display devices including television receivers are shifting from conventional cathode-ray tube displays to thin-screen displays including liquid crystal panels and plasma display panels. With the thin-screen displays, thin image display devices can be provided. A liquid crystal display device requires a backlight unit as a separate lighting device because a liquid crystal panel used therein is not a light-emitting component.

The liquid crystal display device is needed to reduce in thickness and increase in size. For example, Patent Document 1 discloses such a liquid crystal display device. The liquid crystal display device includes an LED and a light guide plate. The LED emits light along a direction that is substantially parallel to a display surface of a liquid crystal panel. The light guide plate includes a light entrance surface and a light output surface. The light entrance surface is provided at the side edge of the light guide plate so as to be opposed to the LED and light emitted from the LED enters the light entrance surface. The light output surface is provided on a front surface of the light guide plate and the light outputs from the light output surface toward the display surface of the liquid crystal panel. A plurality sets of the light guide plate and the LED are arranged along an arrangement direction in which the light guide plate and the LED are arranged. In one set of the light guide plate and the LED, a distal end of the light guide plate that is far from the LED is arranged to be overlapped with the front-surface side of the light guide plate included in the adjacent set of the light guide plate and the LED.

[Patent Document 1] Japanese Unexamined Patent Publication No. 2001-93321

PROBLEM TO BE SOLVED BY THE INVENTION

In the parallel-arranged light guide plates, an end portion of one light guide plate close to the LED is fixed to the LED substrate, and another end portion far from the LED is only placed on a front-surface side of the adjacent light guide plate and is not fixed thereto. Therefore, if vibration is applied from outside during transportation for example, the end portion of the light guide plate that is not fixed may be moved unintentionally toward the front-surface side. The moving of the end portion of the light guide plate toward the front-surface side may move the light entrance surface toward the front side, and this may change relative positions of the light entrance surface and the LED. This lowers light entrance efficiency of the light beams from the LED into the light entrance surface and this lowers brightness. The uneven brightness caused in the light guide plates may cause uneven brightness in a backlight device.

In addition to the vibration, a shape or a size of each light guide plate may not be constant due to manufacturing errors caused in the manufacturing process of the light guide plates. This may cause variation in positions of the end portions of the light guide plates when each light guide plate is provided on the LED substrate. In such a case, the relative positions of the LED and the light entrance surface may be varied in some light guide plates, and this may cause insufficient brightness in the light guide plate or different brightness between some light guide plates.

Especially in the thin liquid crystal display device, the LED is reduced in size and the light guide plate is also reduced in thickness. Accordingly, a height position of the light enter surface is likely to be lowered. Therefore, if the light entrance surface is slightly out of the proper position, the light entrance efficiency of the light beams into the light entrance surface and brightness is greatly changed. Therefore, the solutions to the problems have been desired.

DISCLOSURE OF THE PRESENT INVENTION

The present invention was made in view of the foregoing circumstances. An object of the present invention is to suppress occurrence of uneven brightness.

Means for Solving the Problem

To solve the above problem, a lighting device of the present invention includes at least one light source, a first light guide member and a second light guide member, and a fitting structure. Each of the first and second light guide members includes a light entrance surface disposed so as to face the light source and through which light from the light source enters and a light exit surface through which the light exits. The light exit surface is disposed parallel to an arrangement direction in which the light source and the light entrance surface are arranged. The first light guide member and the second light guide member are arranged parallel to each other in the arrangement direction and partially overlap each other in a direction perpendicular to the light exit surface. The first light guide member is arranged on a relatively light output side and the second light guide member is arranged on a side opposite from the relatively light output side. The fitting structure is provided on each of the first light guide member and the second light guide member. The fitting structure is configured to restrict relative movement of an overlapping area of the first light guide plate toward the light output side with respect to the second light guide member.

For example, vibration may be applied to the device from outside or a shape or a size of each light guide member may be varied due to manufacturing errors in the manufacturing process of the light guide member. In such a case, with the above configuration, the overlapping area of the first light guide member that is provided on a relatively light output side is less likely to move relatively toward the light output side with respect to the second light guide member provided on a side opposite from the light output side by the fitting structure. This hardly causes changes in relative positions of the light entrance surface with respect to the light source. This stabilizes the light entrance efficiency of the light beams into the light entrance surface and uneven brightness is less likely to be caused in each light guide member. In lighting devices that are thin, if the relative positions of the light entrance surface and the light source are slightly changed, the light entrance efficiency of the light beams into the light entrance surface and the brightness are significantly changed. Therefore, the above structure is especially effective for the thin devices.

BEST MODE FOR CARRYING OUT THE INVENTION

First Embodiment

A first embodiment of the present invention will be explained with reference to FIGS. 1 to 15. In this embodiment, a liquid crystal display device 10 will be explained. X-axes, Y-axes and Z-axes in the figures correspond each other so as to indicate the respective directions. In FIGS. 4 to 10, an upper side corresponds to a front-surface side and a lower side corresponds to a rear-surface side.

Figure 1:
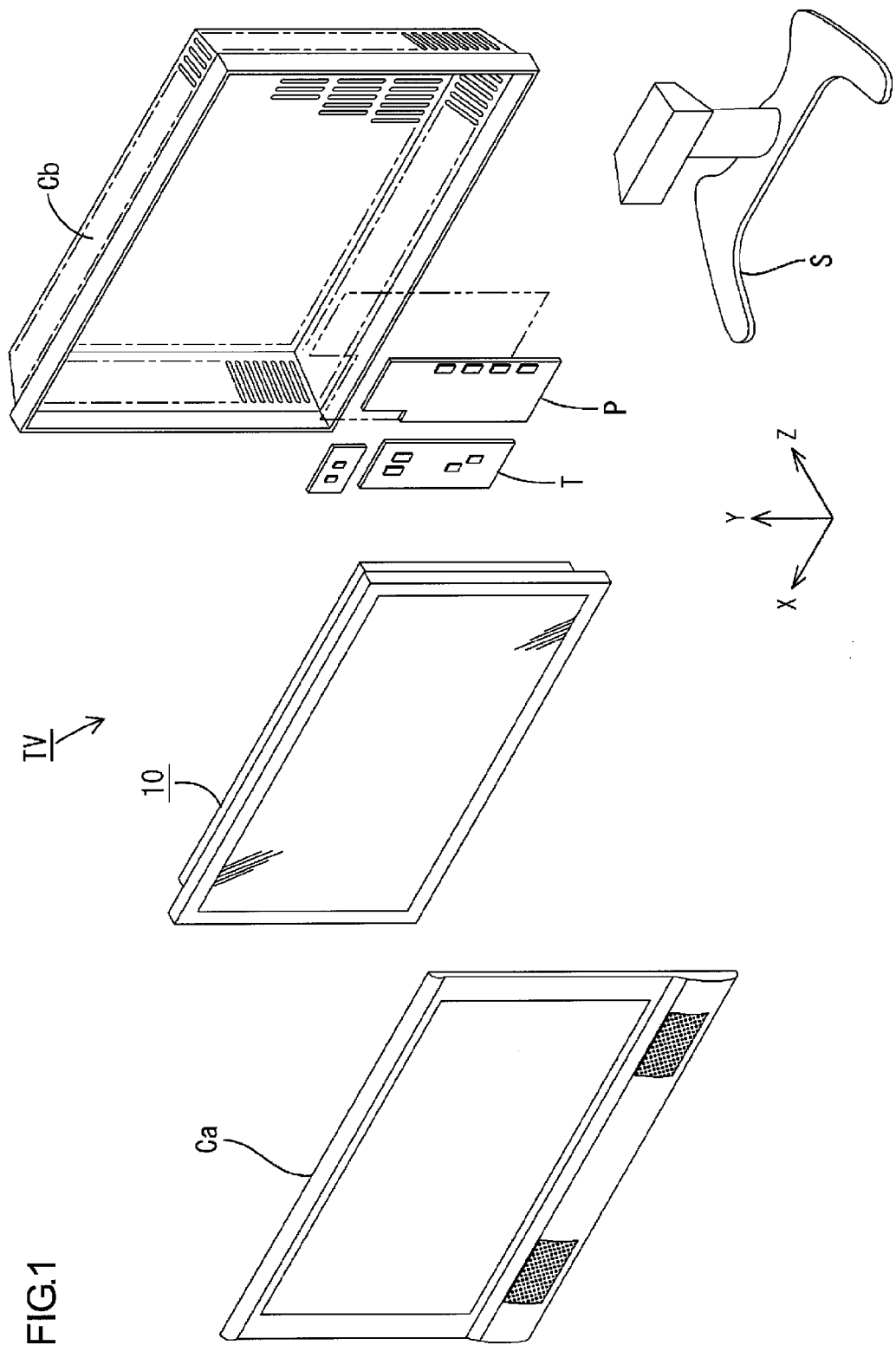
FIG. 1 is an exploded perspective view illustrating a general construction of a television receiver according to a first embodiment.
Figure 2:
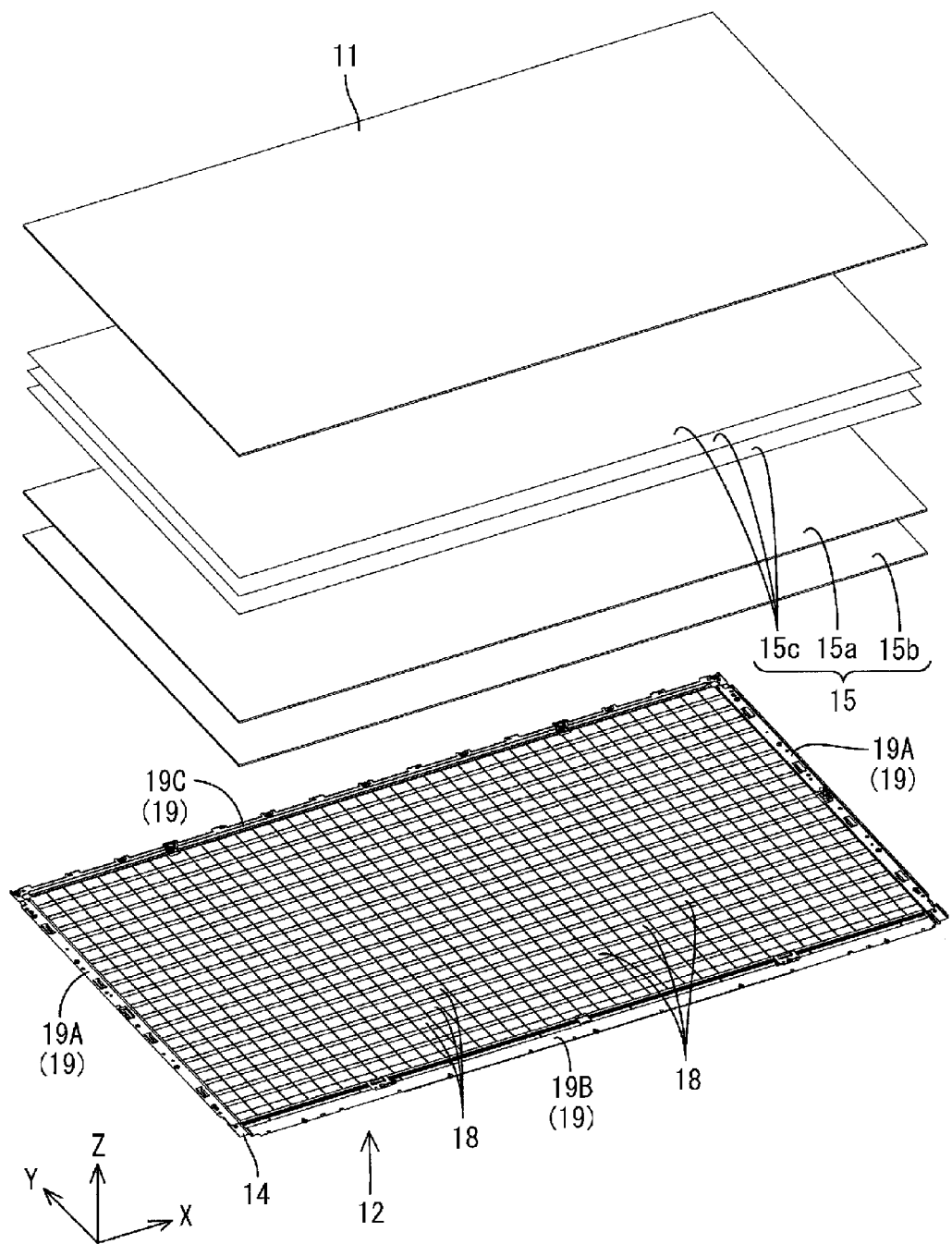
FIG. 2 is an exploded perspective view illustrating a general construction of a liquid crystal panel and a backlight unit.

As illustrated in FIG. 1, a television receiver TV of the present embodiment includes the liquid crystal display device 10 (a display device), front and rear cabinets Ca and Cb, a power source P, and a tuner T. The cabinets Ca and Cb sandwich the liquid crystal display device 10 therebetween from the front and the rear. The liquid crystal display device 10 is housed in the cabinets Ca and Cb. The liquid crystal display device 10 is held by a stand S in a vertical position in which a display surface 11a is set along a substantially vertical direction (the Y-axis direction). The liquid crystal display device 10 has a landscape rectangular overall shape. As illustrated in FIG. 2, the liquid crystal display device 10 includes a liquid crystal panel 11, which a display panel, and a backlight unit 12 (a lighting device), which is an external light source. The liquid crystal panel 11 and the backlight unit 12 are held together by a frame-shaped bezel 13.

"The display surface 11a is set along the vertical direction" is not limited to a condition that the display surface 11a is set parallel to the vertical direction. The display surface 11a may be set along a direction closer to the vertical direction than the horizontal direction. For example, the display surface 11a may be 0° to 45° slanted to the vertical direction, preferably 0° to 30° slanted.

Next, the liquid crystal panel 11 and the backlight unit 12 included in the liquid crystal display device 10 will be explained. The liquid crystal panel (a display panel) 11 has a rectangular plan view and includes a pair of transparent glass substrates bonded together with a predetermined gap therebetween and liquid crystals sealed between the substrates. On one of the glass substrates, switching components (e.g., TFTs), pixel electrodes and an alignment film are arranged. The switching components are connected to gate lines and the source lines that are perpendicular to each other. The pixel electrodes are connected to the switching components. On the other glass substrate, color filters including R (red) G (green) B (blue) color sections in predetermined arrangement, a counter electrode and an alignment film are arranged. Polarizing plates are arranged on outer surfaces of the glass substrates, respectively (refer to FIG. 5).

Figure 4:
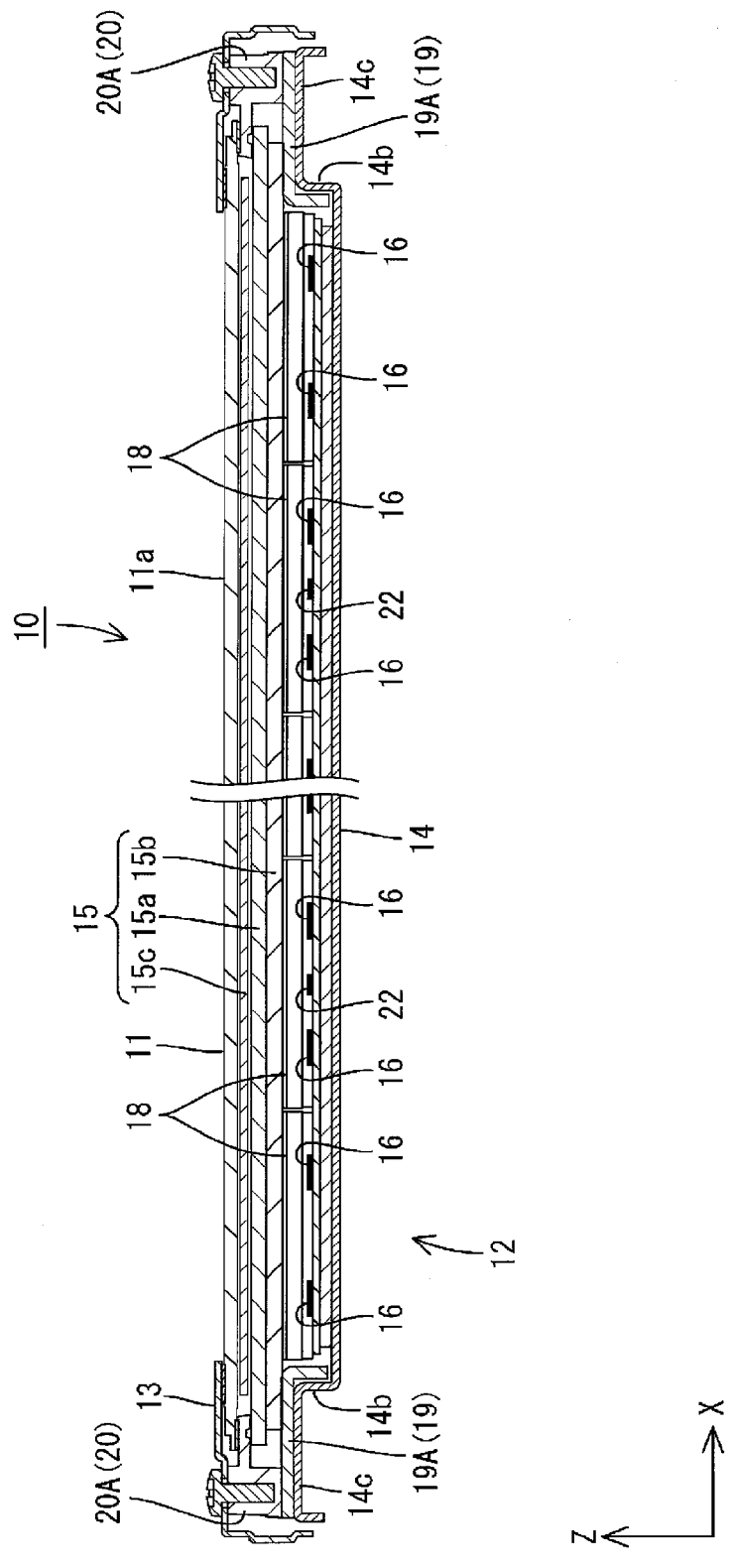
FIG. 4 is a cross-sectional view of a liquid crystal display device along the long-side direction thereof.

Next, the backlight unit 12 will be explained in detail. As illustrated in FIG. 4, the backlight unit 12 includes a chassis 14, an optical member 15, LEDs 16 (light emitting diodes), LED boards 17 and light guide plates 18. The chassis 14 has a box-like overall shape and an opening on the front-surface side (on the liquid crystal panel 11 side, on the light exit side). The optical member 15 is arranged so as to cover the opening of the chassis 14. The LEDs 16 are light sources arranged inside the chassis 14. The LEDs 16 are mounted on the LED boards 17. Light emitted from the LEDs 16 is directed to the optical member 15 by the light guide plates 18. The backlight unit 12 further includes a receiving member 19, a holding member 20 and heat sinks 21. The receiving member 19 receives diffusers 15a and 15b included in the optical member 15 from the rear-surface side. The holding member 20 holds the diffusers 15a and 15b from the front-surface side. The heat sinks 21 are provided for dissipation of heat generated during lighting of the LEDs 16.

The backlight unit 12 is constructed by the LEDs 16 each of which is provided on one end (side edge) of the light guide plate 18 and a number of the unit light emitters arranged in series. Each of the unit light emitters includes the light guide plate 18 and the LEDs 16 arranged in series. Specifically, in the backlight unit 12, a number of the unit light emitters (twenty of them in FIG. 3) are arranged in series along an arrangement direction (an Y-axis direction) in which such the LEDs 16 and the light guide plates 18 are arranged in series, that is in a tandem arrangement (see FIGS. 7 to 9). Furthermore, the backlight unit 12 includes a number of the unit light emitters (forty of them in FIG. 3) arranged parallel to each other in a direction substantially perpendicular to the tandem-arrangement direction (the Y-axis direction) and along the display surface 11a (the X-axis direction). Namely, a number of the unit light emitters are arranged on a plane along the display surface 11a (the X-Y plane), that is, two-dimensionally arranged parallel to each other (see FIG. 3).

Figure 8:
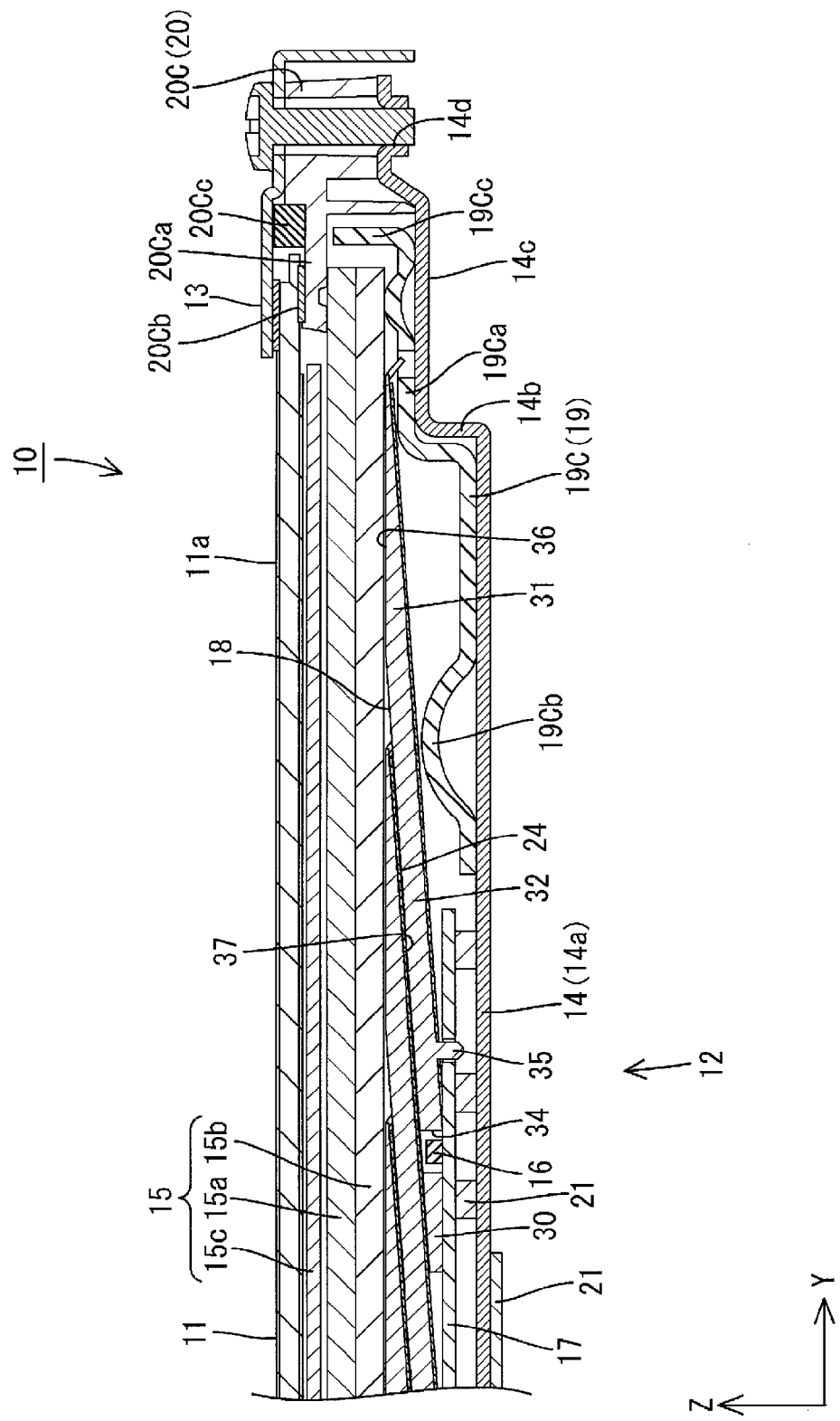
FIG. 8 is a magnified cross-sectional view of an upper end portion of the liquid crystal display device in FIG. 3 along the short side direction thereof.

Next, components of the backlight unit 12 will be explained in detail. The chassis 14 is made of metal and has a shallow-box-like overall shape (or a shallow-bowl-like overall shape) with the opening on the front-surface side as illustrated in FIG. 4. The chassis 14 includes a bottom plate 14a, side plates 14b and support plates 14c. The bottom plate 14a has a rectangular shape similar to the liquid crystal panel 11. The side plates 14b rise from the respective edges of the bottom plate 14a. The support plates 14c project outward from the respective end edges of the side plates 14b. The long-side direction and the short-side direction of the chassis 14 correspond the horizontal direction (the X-axis direction) and the vertical direction (the Y-axis direction), respectively. The support plates 14c of the chassis 14 are configured such that the receiving member 19 and the holding member 20 are placed thereon, respectively, from the front-surface side. Each support plate 14c has mounting holes 14d that are through holes for holding the bezel 13, the receiving member 19 and the holding member 20 together with screws and formed at predetermined positions and one of the mounting holes 14d is illustrated in FIG. 8. An outer edge portion of each support plate 14c on the long side is folded so as to be parallel to the corresponding side plate 14b (see FIG. 4). The bottom plate 14a has insertion holes 14e that are through holes for inserting clips 23 therein (see FIGS. 5 and 6). The light guide plates 18 are mounted to the chassis with the clips 23. The bottom plate 14a also has mounting holes (not shown). The mounting holes are through holes for mounting the LED boards 17 with screws and formed at predetermined positions.

As illustrated in FIG. 4, the optical member 15 is arranged between the liquid crystal panel 11 and the light guide plates 18. It includes the diffusers 15a and 15b arranged on the light guide plate 18 side, and an optical sheet 15c arranged on the liquid crystal panel 11 side. Each of the diffusers 15a and 15b includes a transparent resin base material having a predetermined thickness and a large number of diffusing particles scattered in the base material. The diffusers 15a and 15b have functions of diffusing light that passes therethrough. The diffusers 15a and 15b having the same thickness are placed on top of each other. The optical sheet 15c is a thin sheet having a smaller thickness than that of the diffusers 15a and 15b. The optical sheet 15c includes three sheets placed on top of each other, more specifically, a diffuser sheet, a lens sheet and a reflection-type polarizing sheet arranged in this order from the diffuser 15a (15b) side (i.e., from the rear-surface side).

Figure 3:
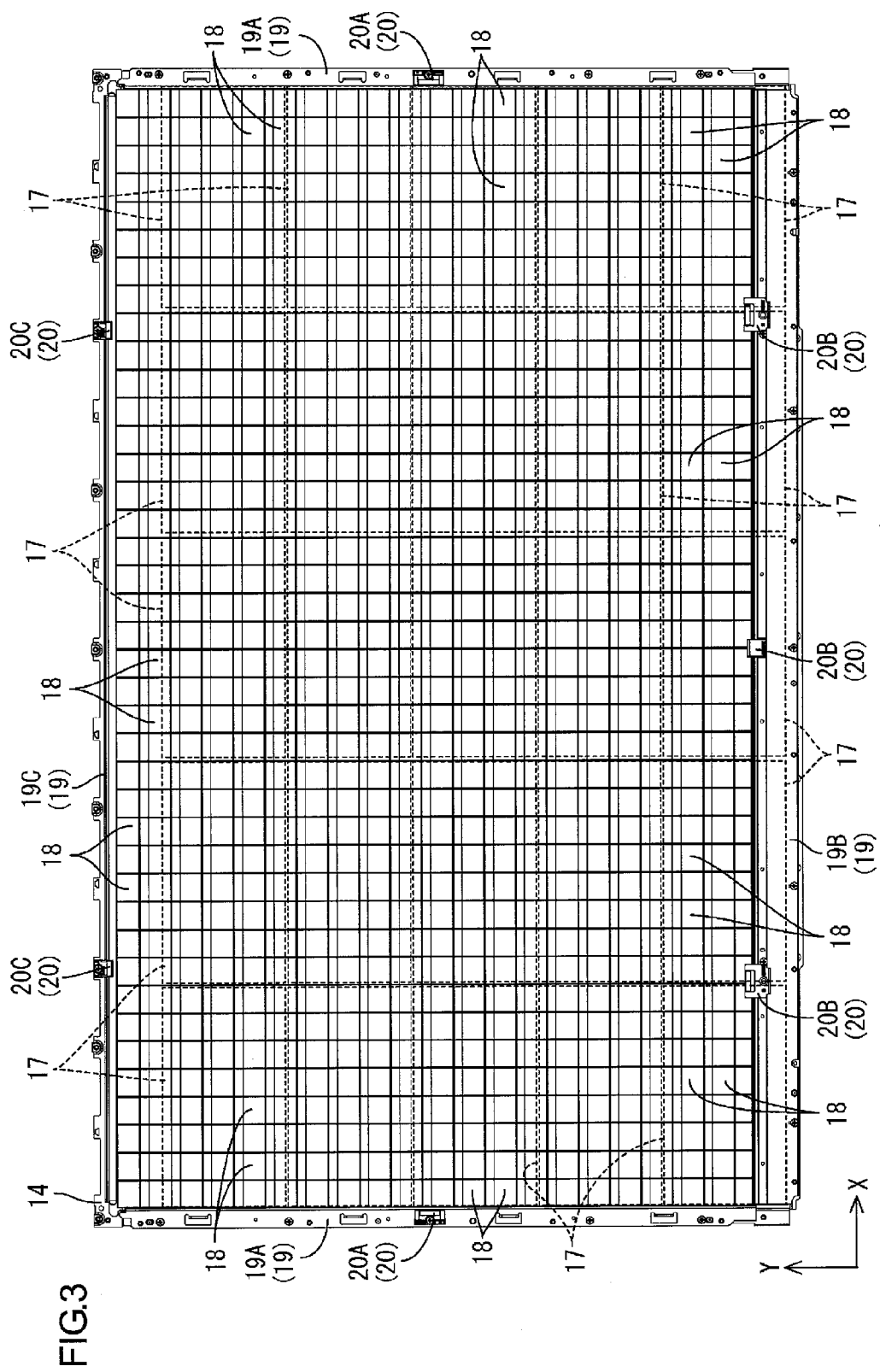
FIG. 3 is a plan view of the backlight unit.

The receiving member 19 is arranged on outer edge portions of the chassis 14 and configured to support almost entire outer edge portions of the diffuser plates 15a and 15b. As illustrated in FIG. 3, the receiving member 19 includes a pair of short-side receiving parts 19A and two different long-side receiving parts 19B and 19C. The short-side receiving parts 19A are arranged so as to extend along the respective short sides of the chassis 14. The long-side receiving parts 19B and 19C are arranged so as to extend along the respective long sides of the chassis 14. The parts of the receiving member 19 are configured differently according to mounting locations. The symbols 19A to 19C are used for referring to the parts of the receiving member 19 independently. To refer to the receiving member 19 as a whole, the numeral 19 without the letters is used.

Figure 5:
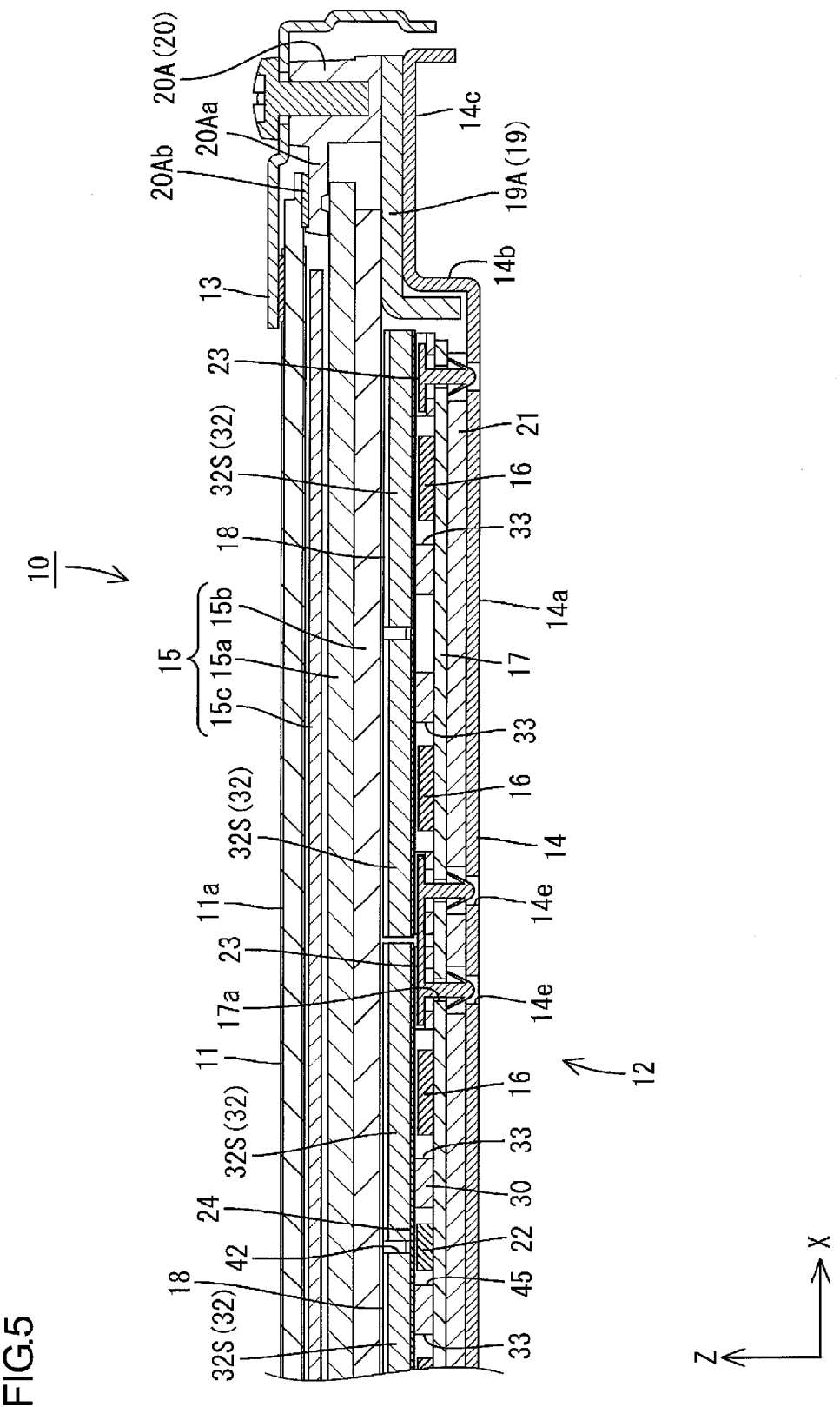
FIG. 5 is a magnified cross-sectional view illustrating an end portion of the liquid crystal display in FIG. 4.

As illustrated in FIGS. 4 and 5, the short-side receiving parts 19A have substantially same configurations. Each of them has a substantially L-shape cross section so as to extend along a surface of the support plate 14c and an inner surface of the side plate 14b. A part of each short-side receiving part 19A parallel to the support plate 14c receives the diffuser 15b in an inner area and a short-side holding part 20A in an outer area. The short-side receiving parts 19A cover substantially entire lengths of the support plates 14c and the side plates 14b on the short sides.

Figure 7:
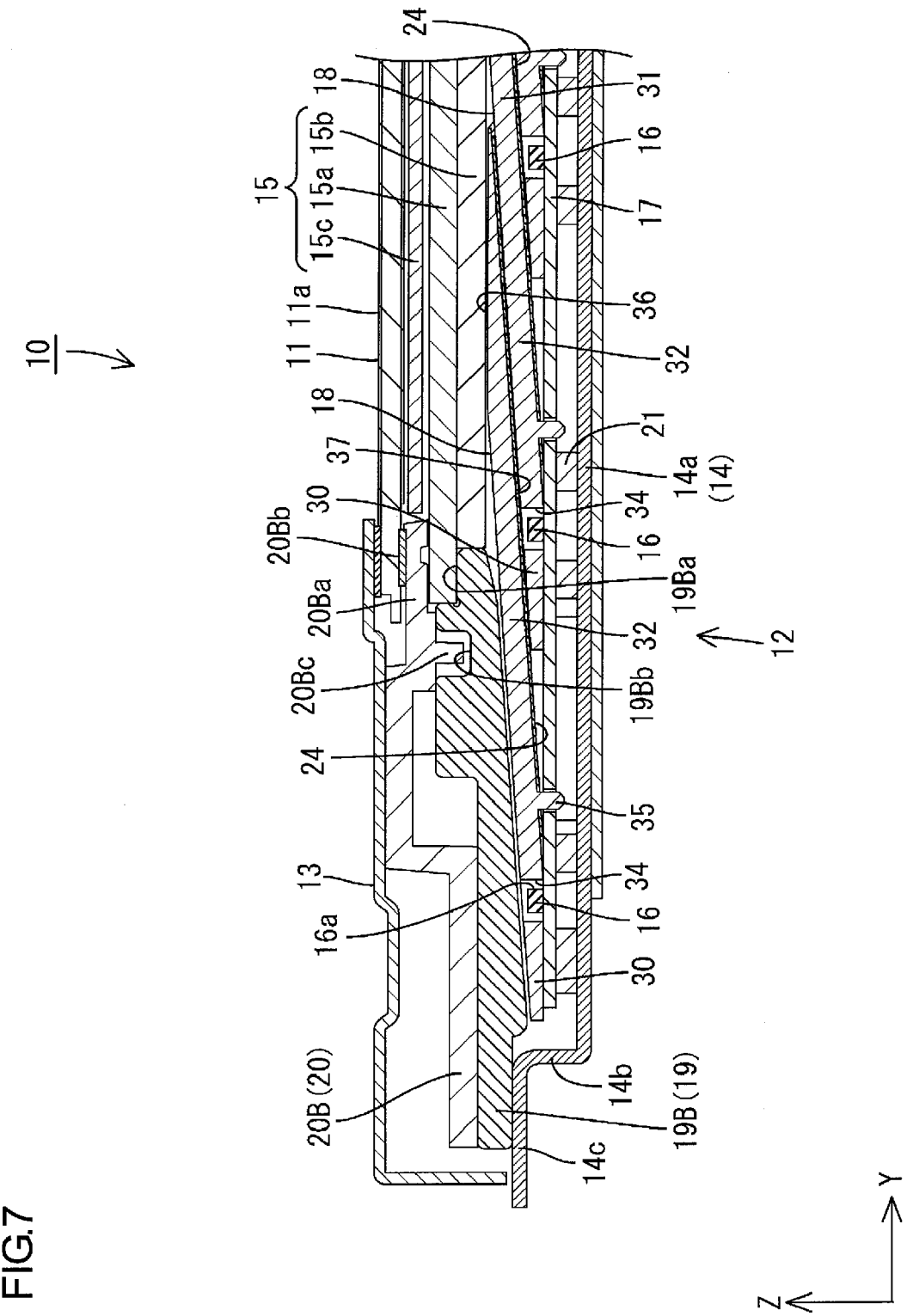
FIG. 7 is a magnified cross-sectional view of a lower end portion of the liquid crystal display device in FIG. 3 along the short side direction thereof.

The long-side receiving parts 19B and 19C are configured differently. Specifically, the first long-side receiving part 19B is arranged on the lower side in the vertical direction of the chassis 14 (the lower side in FIG. 3). As illustrated in FIG. 7, it is arranged so as to extend along the inner surface of the support plate 14c and a surface of the light guide plate 18 located on the front side (a surface opposite from the LED board 17 side). The light guide plate 18 is located adjacent to the support plate 14c. The first long-side receiving part 19B has a function of pressing the adjacent light guide plate 18 from the front-surface side. The first long-side receiving part 19B receives the diffuser 15a that is located on the front-surface side in the inner edge area, and a long-side holding part 20B in the outer edge area. The inner edge area of the first long-side receiving part 19B has a stepped portion 19Ba formed so as to correspond to the shape of the outer edge area of the diffuser 15a that is located on the front-surface side. Adjacent to the stepped portion 19Ba, recesses 19Bb for receiving protrusions 20Bc of the long-side holding part 20B are formed in the first long-side receiving part 19B on the outer side with respect to the stepped portions 19Ba. The first long-side receiving part 19B coves substantially entire lengths of the support plate 14c on the long side and non-luminous portions of the adjacent light guide plates 18 (a board mounting portion 30 and a light guide portion 32). The width of the first long-side receiving part 19B is larger than those of the other receiving parts 19A and 19C by an area that covers the non-luminous portion of the light guide plate 18.

The second long-side receiving part 19C is arranged on the upper side of the chassis 14 (the upper side in FIG. 3). As illustrated in FIG. 8, the second long-side receiving part 19C has a crank-like cross section. It is arranged along the inner surfaces of the support plate 14c, the side plate 14b and the bottom plate 14a. A diffuser support protrusion 19Ca is formed in an area of the second long-side receiving part 19C parallel to the support plate 14c so as to protrude on the front-surface side. The diffuser support protrusion 19Ca has an arch-shaped cross section. It is brought into contact with the diffuser 15b on the rear-surface side from the rear-surface side. A light guide plate support protrusion 19Cb is formed in an area of the second long-side receiving part 19C parallel to the bottom plate 14a so as to protrude on the front-surface side. The light guide plate support protrusion 19Cb has an arch-shaped cross section. It is brought into contact with the adjacent light guide plate 18 from the rear-surface side. The second long-side receiving part 19C has functions of receiving the diffusers 15a and 15b (i.e., support functions) and light guide plate 18 (i.e., support functions). An area of the second long-side receiving part 19C parallel to the support plate 14c and inside with respect to the diffuser support protrusion 19Ca is brought into contact with the end portion of the light guide plate 18 from the rear-surface side. The light guide plate 18 is supported at two points: at the end portion with the support protrusion 19Ca and at the base portion with the light guide support protrusion 19Cb. The second long-side receiving part 19C covers substantially entire areas of the support plate 14c and the side plate 14b on the long side. A projecting portion 19Cc rises from the outer edge of the second long-side receiving part 19C so as to face the end surfaces of the diffusers 15a and 15b.

As illustrated in FIG. 3, the holding member 20 is arranged on outer edge areas of the chassis 14. A width of the holding member 20 is smaller than a dimension of the corresponding short sides of the chassis 14 and the diffusers 15a and 15b. Therefore, the holding member 20 presses parts of the outer edge portion of the diffusers 15a. The holding member 20 includes short-side holding parts 20A arranged on the respective short-edge area of the chassis 14 and a plurality of long-side holding parts 20B and 20C are arranged on each long-edge area. The parts of the holding member 20 are configured differently according to mounting locations. The symbols 20A to 20C are used for referring to the parts of the holding member 20 independently. To refer to the holding member 20 as a whole, the numeral 20 without the letters is used.

The short-side holding parts 20A are arranged around central portions of the respective short-edge areas of the chassis 14. They are placed on the outer-edge portions of the short-side receiving parts 19A and fixed with screws. As illustrated in FIGS. 4 and 5, each short-side holding part 20A has a holding tab 20Aa that projects inward from a body that is screwed. The diffuser 15a is pressed by edge areas of the holding tabs 20Aa from the front-surface side. The liquid crystal panel 11 is placed on the holding tabs 20Aa from the front-surface side and held between the bezel 13 and the holding tabs 20Aa. Cushion materials 20Ab for the liquid crystal panel 11 are arranged on surfaces of the holding tabs 20Aa.

The long-side holding parts 20B and 20C are configured differently. The first long-side holding parts 20B is arranged on the lower side of the chassis 14 in the vertical direction (the lower side in FIG. 3). As illustrated in FIG. 3, three long-side holding parts 20B are arranged at substantially equal intervals. One of them is arranged around the middle of the long side area of the chassis 14 on the lower side in FIG. 3 and the other two are arranged on either side of the one arranged in the middle. They are placed on the outer edge area of the first long-side receiving part 19B and screwed. As illustrated in FIG. 7, each first long-side holding part 20B has a holding tab 20Ba on the inner side similar to the short-side holding parts 20A. A rear surface of the holding tab 20Ba presses the diffuser 15a. Front-side surfaces receive the liquid crystal display panel 11 via cushion materials 20Bb. The first long-side holding parts 20B have widths larger than those of the other holding parts 20A and 20C so as to correspond to the first long-side receiving parts 19B. Projections 20Bc for positioning the first long-side holding parts 20B to the first long-side receiving parts 19B are formed on the surfaces of the first long-side holding parts 20B on the rear-surface side.

The second long-side holding parts 20C are arranged on the upper side of the chassis 14 in the vertical direction (the upper side in FIG. 3). As illustrated in FIG. 3, two second long-side holding parts 20C are eccentrically arranged in a long-edge area of the chassis 14 on the upper side in FIG. 3. They are directly placed on the support plate 14c of the chassis 14 and screwed. As illustrated in FIG. 8, each second long-side holding part 20C has a holding tab 20Ca on the inner side, similar to the short-side holding parts 20A and the first long-side holing parts 20B. Rear surfaces of the holding tabs 20Ca press the diffuser 15a and the front-side surfaces receive the liquid crystal panel 11 via cushion materials 20Cb. Other cushion materials 20Cc are provided between the holding tabs 20Ca of the second long-side holding parts 20C and the bezel 13.

The heat sinks 21 are made of synthetic resin or metal having high thermal conductivity and formed in a sheet-like shape. As illustrated in FIGS. 5 and 7, the heat sinks 21 are arranged inside and outside the chassis 14, respectively. The heat sink 21 inside the chassis 14 is placed between the bottom plate 14a of the chassis 14 and the LED boards 17. It has cutouts for the components in some areas. The heat sink 21 outside the chassis 14 is arranged on the rear surface of the bottom plate 14a of the chassis 14.

Figure 10:
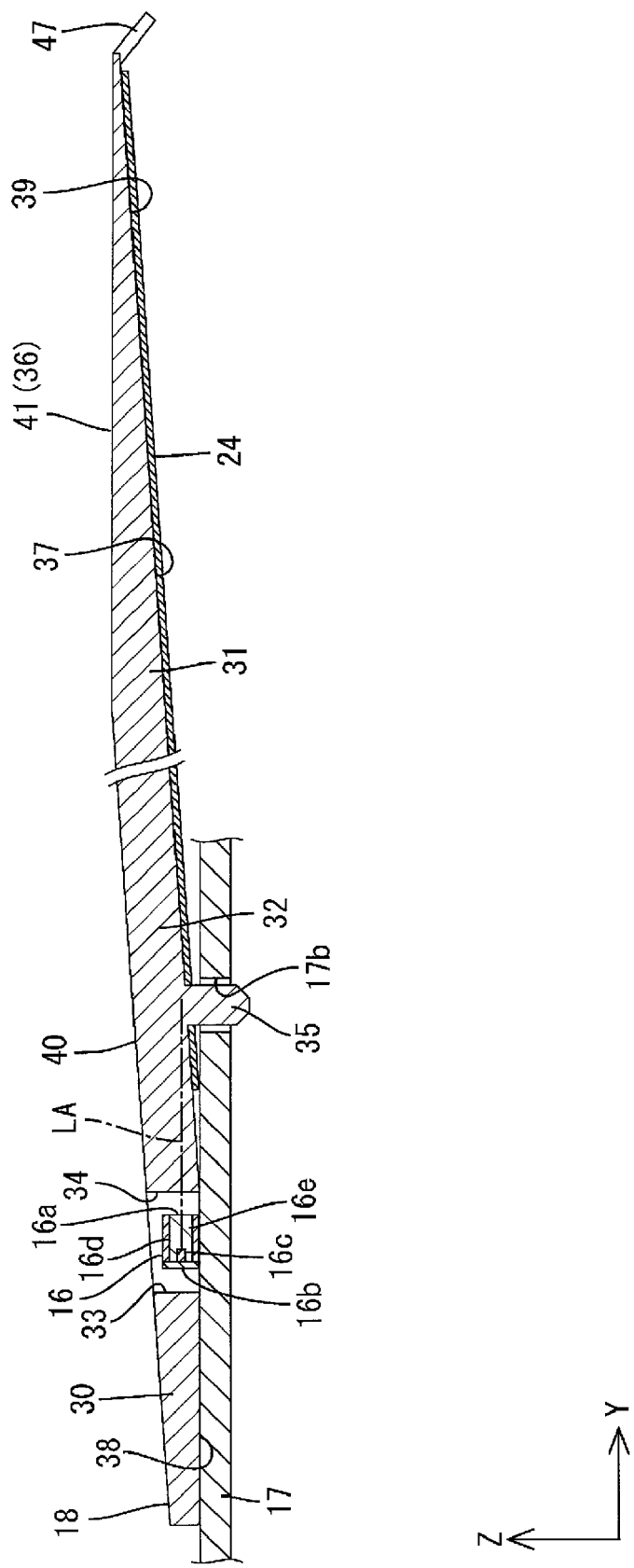
FIG. 10 is a magnified cross-sectional view of a light guide plate illustrated in FIG. 9.

As illustrated in FIG. 10, the LEDs 16 are surface-mounted to the LED boards 17, that is, the LEDs 16 are surface-mount LEDs. Each LED 16 has a block-like overall shape that is long in the horizontal direction. The LEDs 16 are side emitting LEDs. A side surface of each LED 16 that stands upright from a mounting surface is a light emitting surface 16a. The mounting surface is placed against the LED board 17 (i.e., the bottom surface that is in contact with the LED board 17). A light axis LA of light emitted from the LED 16 is substantially parallel to the display surface 11a of the liquid crystal display panel 11 (the light exit surface 36 of the light guide plate 18) (see FIGS. 7 and 10). Specifically, the light axis LA of the light emitted from the LED 16 matches the short-side direction (the Y-axis direction) of the chassis 14, that is, the vertical direction. The light travels toward the upper side in the vertical direction (a travel direction of the outgoing light from the light exit surface 16a) (see FIGS. 3 and 7). The light emitted from the LED 16 three-dimensionally radiates around the light axis LA in a specified angle range. The directivity thereof is higher than cold cathode tubes. Namely, angle distributions of the LED 16 shows a tendency that the emission intensity of the LED 16 is significantly high along the light axis LA and sharply decreases as the angle to the light axis LA increases. The longitudinal direction of the LED 16 matches the long-side direction of the chassis 14 (the X-axis direction).

As illustrated in FIG. 10, the LED 16 includes a plurality of LED chips 16c mounted on a board 16b that is arranged on an opposite side from the light emitting surface 16a (the rear-surface side). The LED chips 16c are light emitting components. The LED 16 is housed in the housing 16d and an inner space of the housing 16d is closed with a resin member 16e. The LED 16 includes three different kinds of the LED chips 16c with different main emission wavelengths. Specifically, each LED chip 16c emits a single color of light of red (R), green (G) or blue (B). The LED chips 16c are arranged parallel to each other along the longitudinal direction of the LED 16. The housing 16d is formed in a drum-like shape that is long in the horizontal direction and in white that provides highlight reflectivity. The rear surface of the board 16b is soldered to a land on the LED board 17.

Each LED board 17 is made of synthetic resin and the surfaces thereof (including a surface facing the light guide plate 18) are in white that provides high light reflectivity. As illustrated in FIG. 3, the LED board 17 is formed in a plate-like shape having a rectangular plan view. The LED board 17 has along dimension smaller than the short dimension of the bottom plate 14a and thus it can partially cover the bottom plate 14a of the chassis 14. The LED boards 17 are in a plane arrangement in a grid pattern on the surface of the bottom plate 14a of the chassis 14. In FIG. 3, five along the long-side direction of the chassis 14 by five along the short-side direction and a total of 25 LED boards 17 are arranged parallel to each other. Wiring patterns that are metal films are formed on each LED board 17 and the LEDs 16 are mounted in predetermined locations on the LED board 17. The LED boards 17 are connected to an external control board (not shown). The control board is configured to feed currents for turning on the LEDs 16 and to perform driving control of the LEDs 16. A number of LEDs 16 are arranged in a planar grid pattern on each LED board 17. The arrangement pitch of the LEDs 16 corresponds the arrangement pitch of the light guide plates 18, which will be explained later. Specifically, eight along the long-side direction of the LED board 17 by four along the short-side direction thereof and a total of 32 LEDs 16 are arranged parallel to each other on the LED board 17. Photo sensors 22 are also mounted on the respective LED boards 17. Light emitting conditions of the LEDs 16 are determined by the photo sensors 22 and thus feedback control can be performed on the LEDs 16 (see FIGS. 4 and 12). Each LED board 17 has mounting holes 17a for receiving the clips 23 for mounting the light guide plates 18 (see FIG. 6). It also has positioning holes 17b for positioning the light guide plates 18 (see FIG. 10). The holes are formed in locations corresponding to mounting locations of the light guide plates 18.

Figure 9:
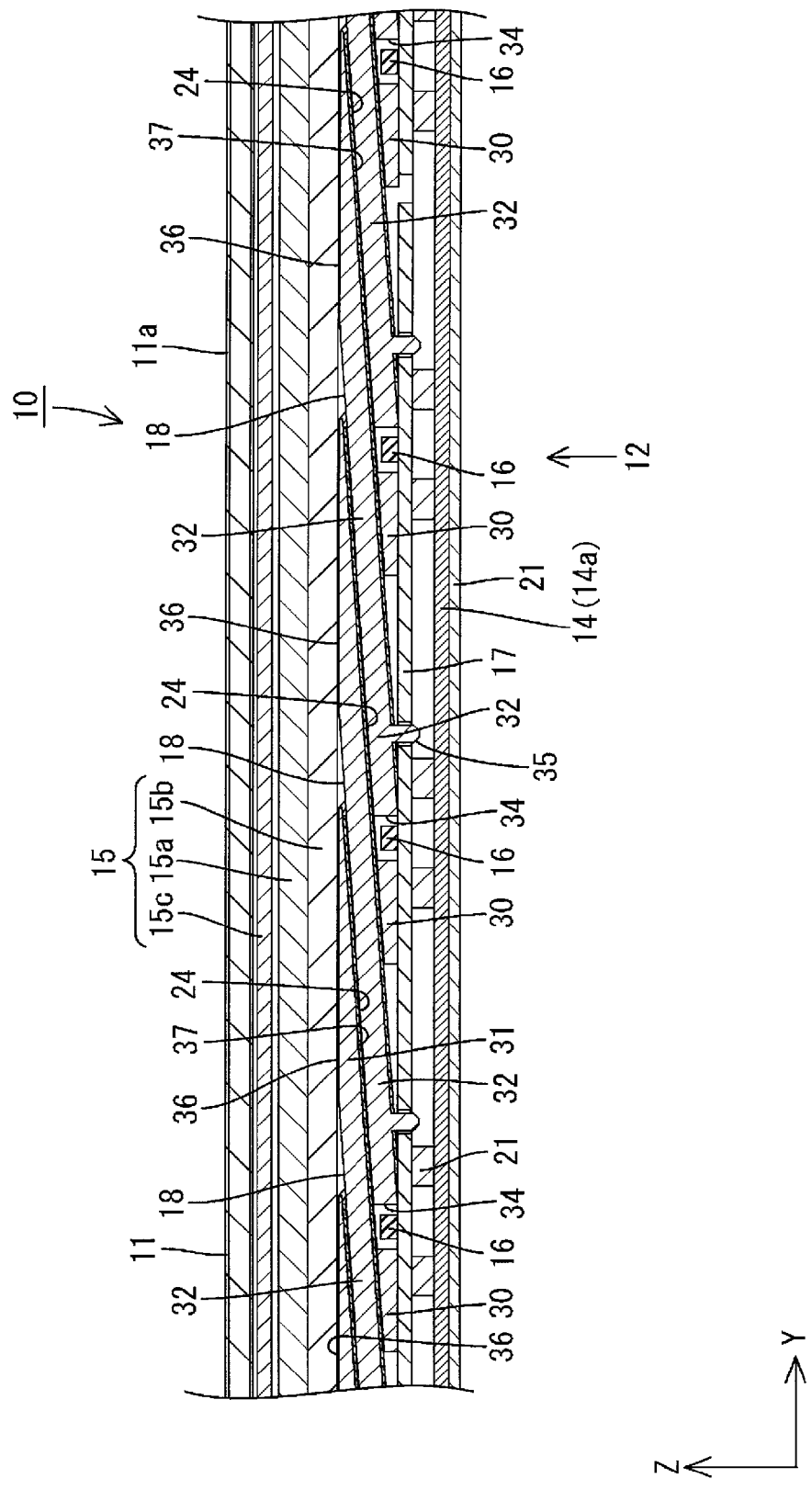
FIG. 9 is a magnified cross-sectional view of a middle portion of the liquid crystal display device in FIG. 3 along the short side direction thereof.
Figure 13:
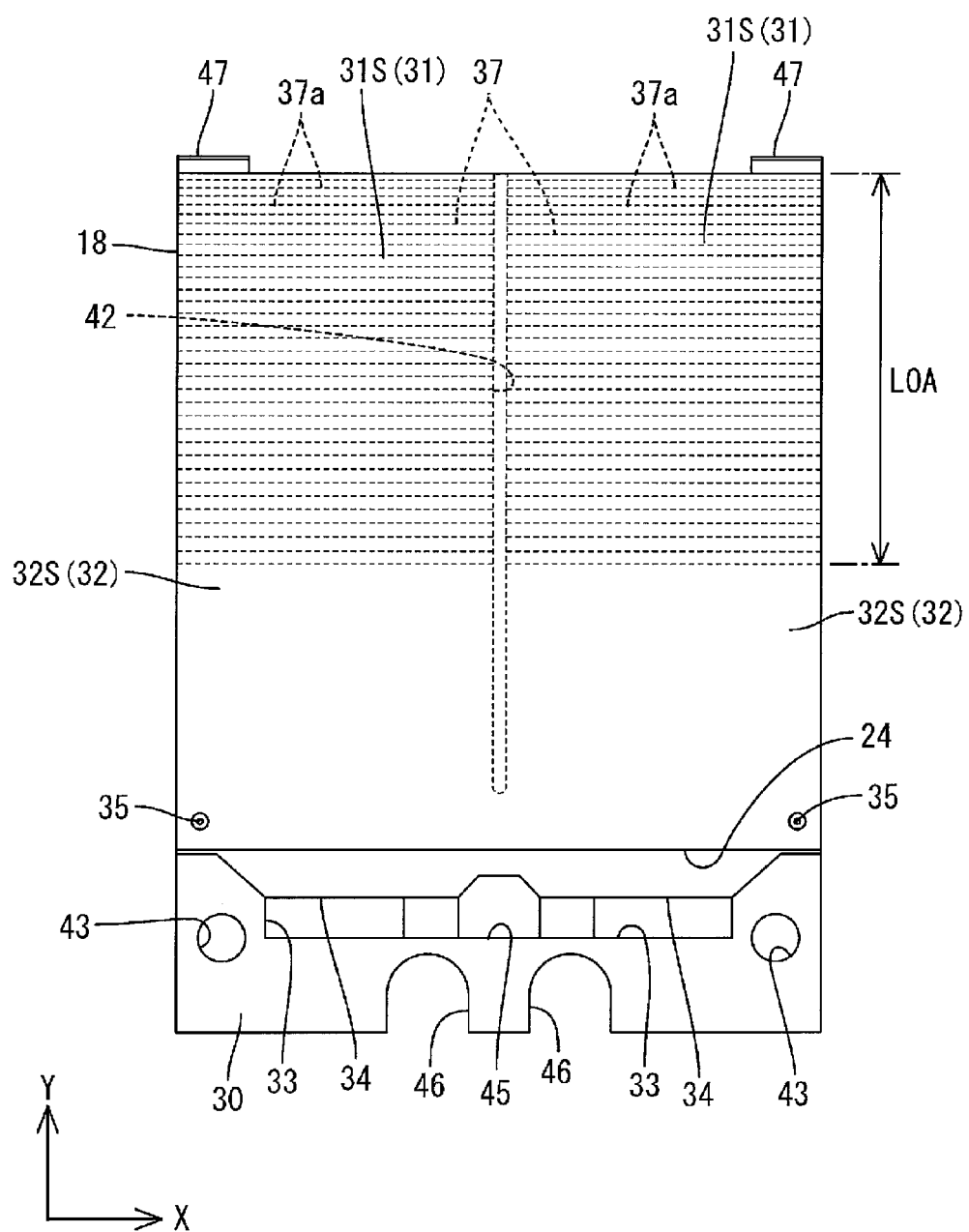
FIG. 13 is a bottom view of the light guide plate.

Each light guide plate 18 is made of substantially transparent (i.e., having high light transmission capability) synthetic resin (e.g. polycarbonate), a reflective index of which is significantly higher than that of air. As illustrated in FIGS. 7 to 9, the light guide plate 18 draws the light emitted from the LED 16 in the vertical direction (the Y-axis direction), transmit the light therethrough and directs it toward the optical member 15 (in the Z direction). As illustrated in FIG. 13, the light guide plate 18 has a plate-like shape having a rectangular overall plan view. The long-side direction of the light guide plate 18 is parallel to the light axis LA of the LED 16 (the light emitting direction) and the short-side direction of the chassis 14 (the Y-axis direction or the vertical direction). The short-side direction is parallel to the long-side direction of the chassis 14 (the X-axis direction or the horizontal direction). Next, a cross-sectional structure of the light guide plate 18 along the long-side direction will be explained in detail.

As illustrated in FIGS. 7 to 9, the light guide plate 18 has a board mounting portion 30 that is located at one of end portions of the long dimension (on the LED 16 side) and attached to the LED board 17. The other end portion of the long dimension is configured as a light exit portion 31 from which light exits toward the diffusers 15a and 15b. The middle portion between the board mounting portion 30 and the light exit portion 31 is configured as a light guide portion 32. The light guide portion 32 is configured to direct the light to the light exit portion 31 without losing most of the light. Namely, the board mounting portion 30 (LED 16), the light guide portion 32 and the light exit portion 31 are arranged in this order from the LED 16 side along the long-side direction of the light guide plate 18, that is, along the light axis LA (the light emitting direction) of the LED 16. The board mounting portion 30 and the light guide portion 32 are non-luminous portions. The light exit portion 31 is a luminous portion. In the following description, a point ahead in a direction from the board mounting portion 30 toward the light exit portion 31 (the light emitting direction of the LED 16 or the direction toward right in FIGS. 7 to 9) is referred to as the front. A point behind in a direction from the light exit portion 31 toward the board mounting portion 30 (the direction toward left in FIGS. 7 to 9) is referred to as the rear.

At the front of the board mounting portion 30, an LED holding space 33 is formed so as to run through in the Z-axis direction. A surface of one of inner walls of the LED holding space 33, which faces the light emitting surface 16a of the LEC 16 (i.e., the front surface), is an entrance surface 34 through which light from the LED 16 enters. The entrance surface 34 is provided at the border between the board mounting portion 30 and the light guide portion 32. About entire peripheries of the light guide portion 32 are flat and smooth surfaces. Scattered reflections do not occur at interfaces (between the surfaces and external air layers). Incident angles of light that strikes the interfaces are larger than a critical angle and thus the light is totally reflected at multiple times while traveling through the light guide portion 32 and guided to the light exit portion 31. Therefore, the light is less likely to leak from the light guide portion 32 and reach other light guide plates 18. The LED chips 16c of the LED 16 emits beams of light in respective RGB colors. Three different colors of the beams are mixed as the beams of light travel through the light guide portion 32 and turn into white. The white light is guided to the light exit portion 31. The positioning protrusion 35 protrudes toward the rear-surface side. It is located in an area of the light guide portion 32 close to the board mounting portion 30 (close to a rear end area). The light guide plate 18 is positioned with respect to the LED board 17 in the X-axis direction and the Y-axis direction when the protrusion 35 is inserted in the positioning hole 17b of the LED board 17.

A surface of the light exit portion 31 which faces toward the front-surface side is about an entire area of the surface opposite the diffuser 15b is a light exit surface 36. The light exit surface 36 is a substantially flat and smooth surface. It is substantially parallel to the plate surfaces of the diffusers 15a and 15b (or the display surface 11a of the liquid crystal display panel 11) and perpendicular to the light entrance surface 34. The rear surface of the light exit portion 31 (the surface opposite from the light exit surface 36 or the surface facing the LED board 17) is processed so as to form microscopic asperities thereon. The surface with microscopic asperities is a scattering surface 37 that scatters light at the interface. The light that travels through the light guide plate 18 is scattered by the interface of the scattering surface 37. Namely, light beams strike the light exit surface 36 at the incident angles smaller than the critical angle and exit through the light exit surface 36. The scattering surface 37 has a plurality lines of perforations 37a that extend straight along the short-side direction of the light guide plate 18 and parallel to each other. The arrangement pitch (the arrangement interval) of the perforations 37a is larger on the rear-end side of the light exit portion 31 than on the front-end side and gradually decreases. Namely, the density of the perforations 37a of the scattering surface 37 is low on the rear-end side and that is high on the front side. The closer to the LED 16 the lower the density becomes, and the farther from the LED 16 the higher the density becomes. With this configuration, brightness in the area of the light exit portion 31 closer to the LED 16 is less likely to differ from brightness in the area of the light exit portion 31 father from the LED 16. As a result, the uniform in-plane brightness distribution can be achieved on the light exit surface 36. The scattering surface 37 is provided in the about entire area of the light exit portion 31. The entire area substantially overlaps the light exit surface 36 in the plan view.

A reflection sheet 24 is placed on surfaces of the light exit portion 31 and the light guide portion 32 (including the scattering surface 37) on the rear-surface side. The reflection sheet 24 is configured to reflect light such that the light enters the light guide plate 18. The reflection sheet 24 is made of synthetic resin and the surface thereof is white that provides high light reflectivity. The reflection sheet 24 is disposed so as to cover about entire areas of the light exit portion 31 and the light guide portion 32 in the plan view (see FIG. 14). With the reflection sheet 24, the light that travels through the light guide plate 18 does not leak to the rear-surface side and the light that is scattered at the scattering surface 37 is effectively directed toward the light exit surface 36. The reflection sheet 24 is attached to the light guide plate 18 with adhesives at points in side edge areas that are less likely to interfere with light that travels through the light guide plate 18. The reflection sheet 24 has holes through which the positioning protrusions 35 are passed so as to correspond to the positioning protrusions 35. The side surface and the front surface (distal end surface) of the light exit portion 31 are flat and smooth surfaces like the light guide plate, and therefore the light is less likely to leak.

As illustrated in FIG. 10, the light guide plate 18 has flat surfaces 38 and 41 on the front-surface side (the surface opposite the diffusers 15a and 15b, including the light exit surface 36) and on the rear-surface side (the surface opposite the LED board 17), respectively. The light guide plate 18 also has sloped surfaces 39 and 40 on the front-surface side and on the rear-surface side, respectively. The flat surfaces 38 and 41 are parallel to the X-Y plane (or the display surface 11a). The sloped surfaces 39 and 40 are sloped with respect to the X-Y plane. Specifically, the rear surface of the board mounting portion 30 is a mounting surface that is placed on the LED board 17. To make the mounting condition stable, the flat surface 38 (the surface parallel to the main board surface of the LED board 17) is provided. The rear surfaces of the light guide portion 32 and the light exit portion 31 form a continuous sloped surface 39. The board mounting portion 30 of the light guide plate 18 is in contact with the LED board 17 and fixed. The light guide portion 32 and the light exit portion 31 are separated from the LED board 17, that is, they are not in contact with the LED board 17. The light guide plate 18 is held in a cantilever manner with the board mounting portion 30 on the rear side as an anchoring point (or a supporting point) and a front end as a free end.

The front surfaces of entire parts of the board mounting portion 30 and the light guide portion 32 and a part of the light exit portion 31 close to the light guide portion 32 on the front-surface side form the continuous sloped surface 40. The sloped surface 40 is sloped at about the same angle and parallel with respect to the sloped surface 39 on the rear-surface side. Namely, the thickness of the light guide plate 18 is substantially constant in the entire light guide portion 32 and a part of the light exit portion 31 close to the light guide portion 32 (close to the LED 16). The surface of the light exit portion 31 on the front side (away from the LED 16) on the front-surface side is the flat surface 41. Namely, the light exit surface 36 includes the flat surface 41 and the sloped surface 40. Most part of the light exit surface 36 on the front side is the flat surface 41 and a part thereof on the light guide portion 32 side is the sloped surface 40. The thickness of the board mounting portion 30 decreases toward the rear end (as further away from the light guide portion 32), that is, the board mounting portion 30 has a tapered shape. A part of the light exit portion 31 adjacent to the light guide portion 32 has the sloped surface 40 on the front-surface side and thus the thickness thereof is constant. A part of the light exit portion 31 located more to the front than the above part has the flat surface 41 on the front-surface side. Therefore, the thickness gradually decreases toward the front end (as further away from the light guide portion 32), that is, the light exit portion 31 has a tapered shape. A long dimension (a dimension measuring in the Y-axis direction) of the flat surface 41 on the front-surface side is smaller than that of the flat surface 38 on the rear-surface side. The front-end portion of the light exit portion 31 has a thickness smaller than that of the rear end portion of the board mounting portion 30. The front end surface (distal end surface) of the light exit portion 31 has a surface area smaller than that of the rear end surface of the board mounting portion 30. The entire peripheries of the light guide plate 18 (including the side surfaces and the front end surface) are vertical surfaces that extend substantially vertical along the Z-axis direction.

As illustrated in FIG. 13, the light guide plate 18 having the above-described cross-sectional structure includes a pair of the LED holding spaces 33 for holding the LEDs 16. The light guide plate 18 is configured to receive beams of light from two different LEDs 16 and guide them to the diffusers 15a and 15b in optically independent conditions. How light is guided will be explained along with planar arrangements of parts of the light guide plate 18.

The light guide plate 18 has a symmetric shape with a line that passes through the middle of the short side (in the X-axis direction) as a line of symmetry. The LED holding spaces 33 of the board mounting portion 30 are arranged symmetrically a predetermined distance away from the middle of the short side (in the X-axis direction) of the light guide plate 18. Each LED holding space 33 has a horizontally rectangular plan view. The LED holding space 33 is slightly larger than the overall size of the LED 16. Namely, the height (the dimension measuring in the Z-axis direction) and the width (the dimension measuring in the X-axis direction) are slightly larger than those of the LED 16. The surface area of the light entrance surface 34 is significantly larger than the light exit surface 16a. Therefore, the beams of light emitted radially from the LED 16 enter the light guide plate 18 without any loss.

Figure 12:
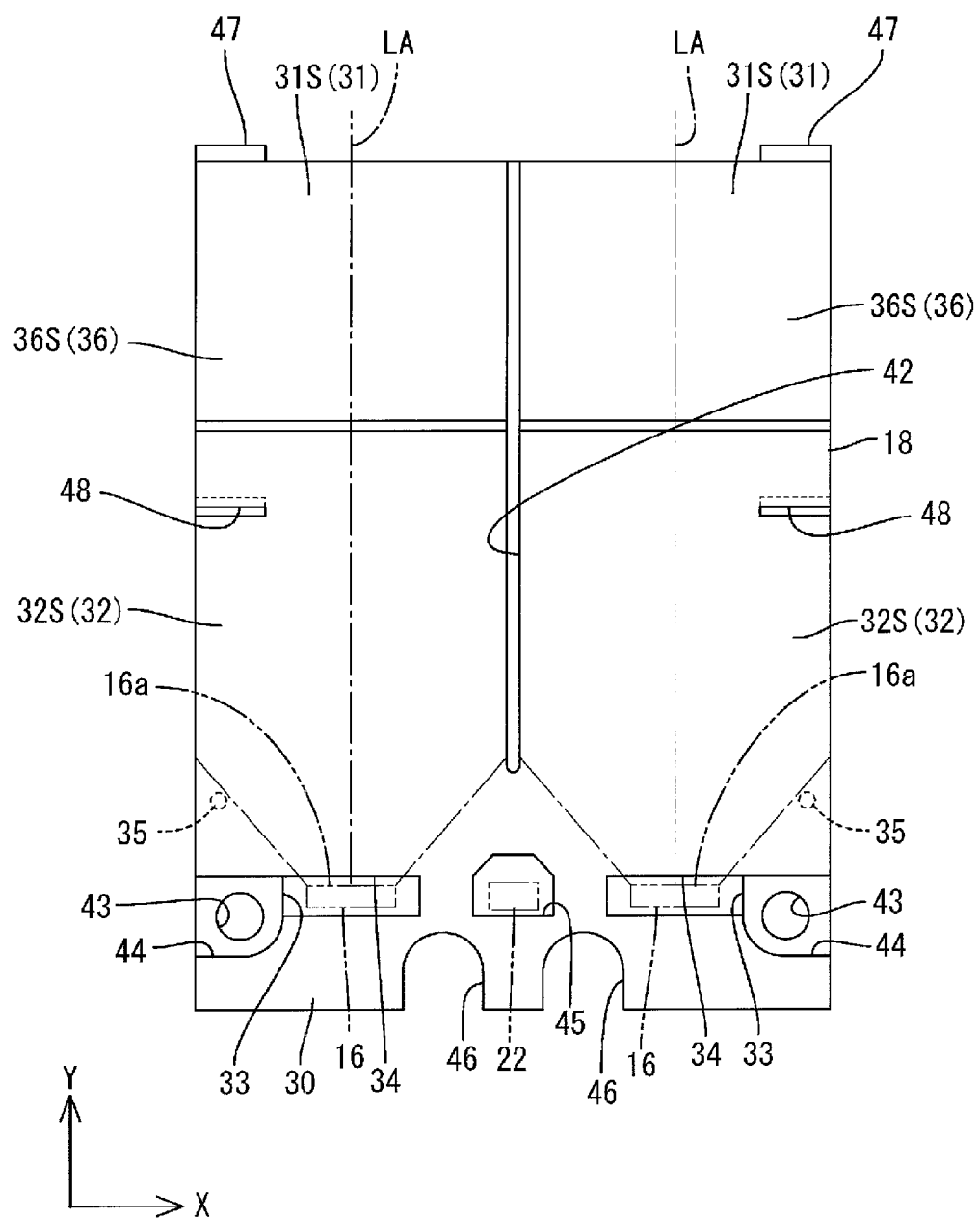
FIG. 12 is a plan view of the light guide plate.

As illustrated in FIG. 12, the LED 16 is arranged in the LED holding space 33 with entire peripheries thereof are separated from the inner walls of the LED holding space 33 (including the light entrance surface 34) by gaps in predetermined sizes. The gaps are provided for compensating for an error related to a mounting position of the light guide plate 18 with respect to the LED board 17. The gaps are required for allowing thermal expansion of the light guide plate 18, which may occur due to heat generated during lighting of the LED 16. By providing the gaps between the LED 16 and the walls of the LED holding space 33, the light guide plate 18 is less likely to touch the LED 16 and thus the LED 16 is protected from being damaged.

At the middle of the light guide plate 18 in the short-side direction, a slit 42 is formed so as to divide the light guide portion 32 and the light exit portion 31 into right and left. The slit 42 runs through the light guide plate 18 in the thickness direction (the Z-axis direction) and toward the front along the Y-axis direction with a constant width. The light guide portion 32 is equally divided into two divided light guide portions 32S and each of the light exit portion 31 and the light exit surface 36 is equally divided into two divided light exit portions 31S and two light exit surfaces 36S respectively by the slit 42. End surfaces of the light guide plate 18 which face the slit 42 form side edge surfaces of the divided light guide portion 32S and the divided light exit portion 31S. The surfaces are flat and smooth surfaces arranged substantially straight along the Z-axis direction. The beams of light passing through the light guide plate 18 all reflect off an interface between the end surfaces and the air layer of the slit 42. Therefore, the beams of light do not travel or mix together between the divided light guide portions 32S that faces each other via the slit 42 or between the divided light exit portions 31S that faces each other via the slit 42. Namely, the divided light guide portions 32S and the divided light exit portions 31A have optically independent configurations.

The rear end of the slit 42 is slightly more to the front than the positioning protrusion 35 and more to the rear than a lighting area of each LED 16 (the area within an angular range with the light axis LA of the LED 16 as the center and indicated by alternate long and short dash lines in FIG. 12). With this configuration, the beams of light emitted from the LED 16 do not directly enter the adjacent divided light guide portion 32S that is not a target to be lit. The positioning protrusions 35 are symmetrically located on the outer end areas of the divided light guide portions 32S (the end portions away from the slit 42) more to the rear than the lighting areas of the respective LEDs 16 with respect to the X-axis direction. Therefore, the positioning protrusions 35 are less likely to be obstacles in optical paths. The slit 42 does not run to the board mounting portion 30. Therefore, the divided light guide portions 32 connect to each other and continue into the board mounting portion 30. This provides mechanical stability in mounting conditions. The light guide plate 18 includes two unit light guide plates (corresponding to the divided light guide portion 32S and the divided light exit portion 31S). The unit light guide plates are optically independent from each other and provided each for each LED 16. The unit light guide plates are connected to each other together with the board mounting portion 30. This simplifies mounting of the light guide plate 18 to the LED board 17. The reflection sheet 24 is placed over the slit 42 (see FIG. 13).

Figure 6:
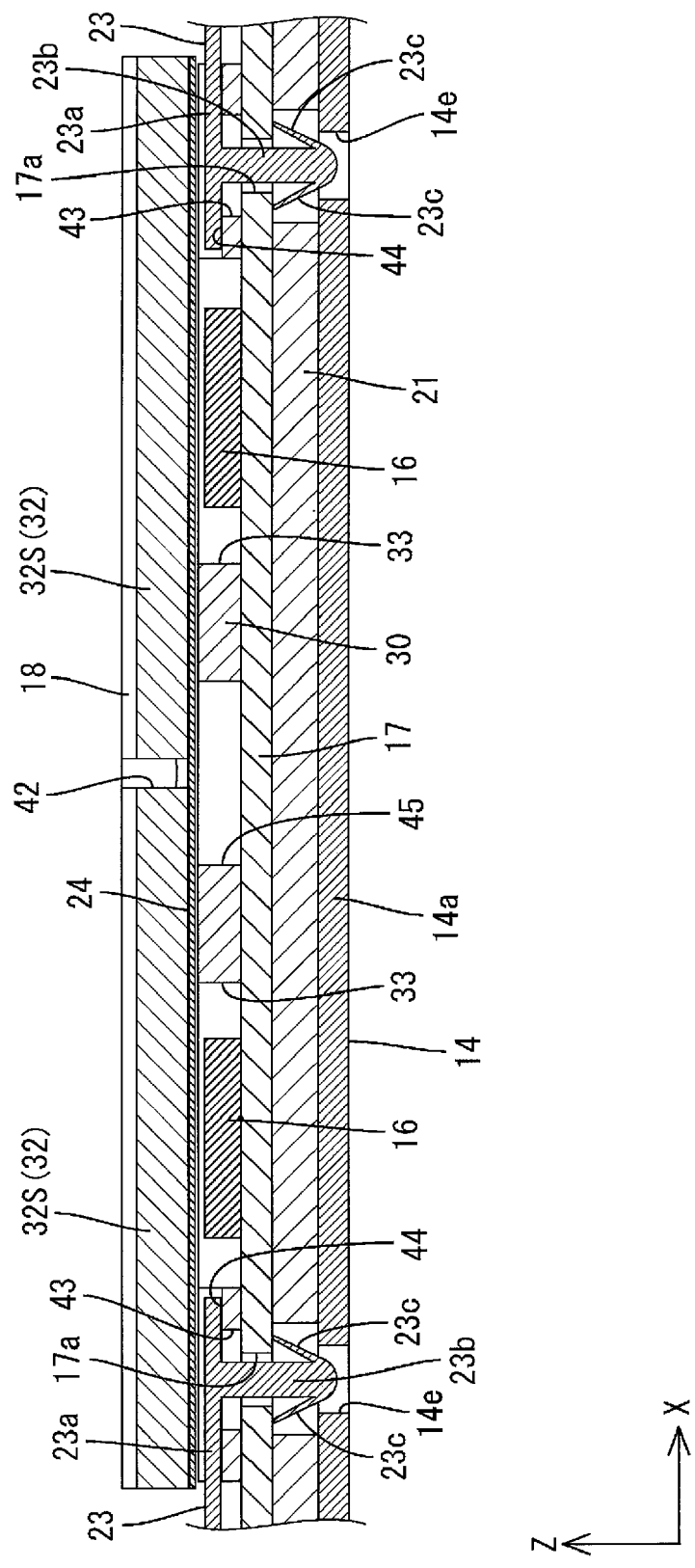
FIG. 6 is a magnified cross-sectional view of a light guide plate illustrated in FIG. 5.
Figure 11:
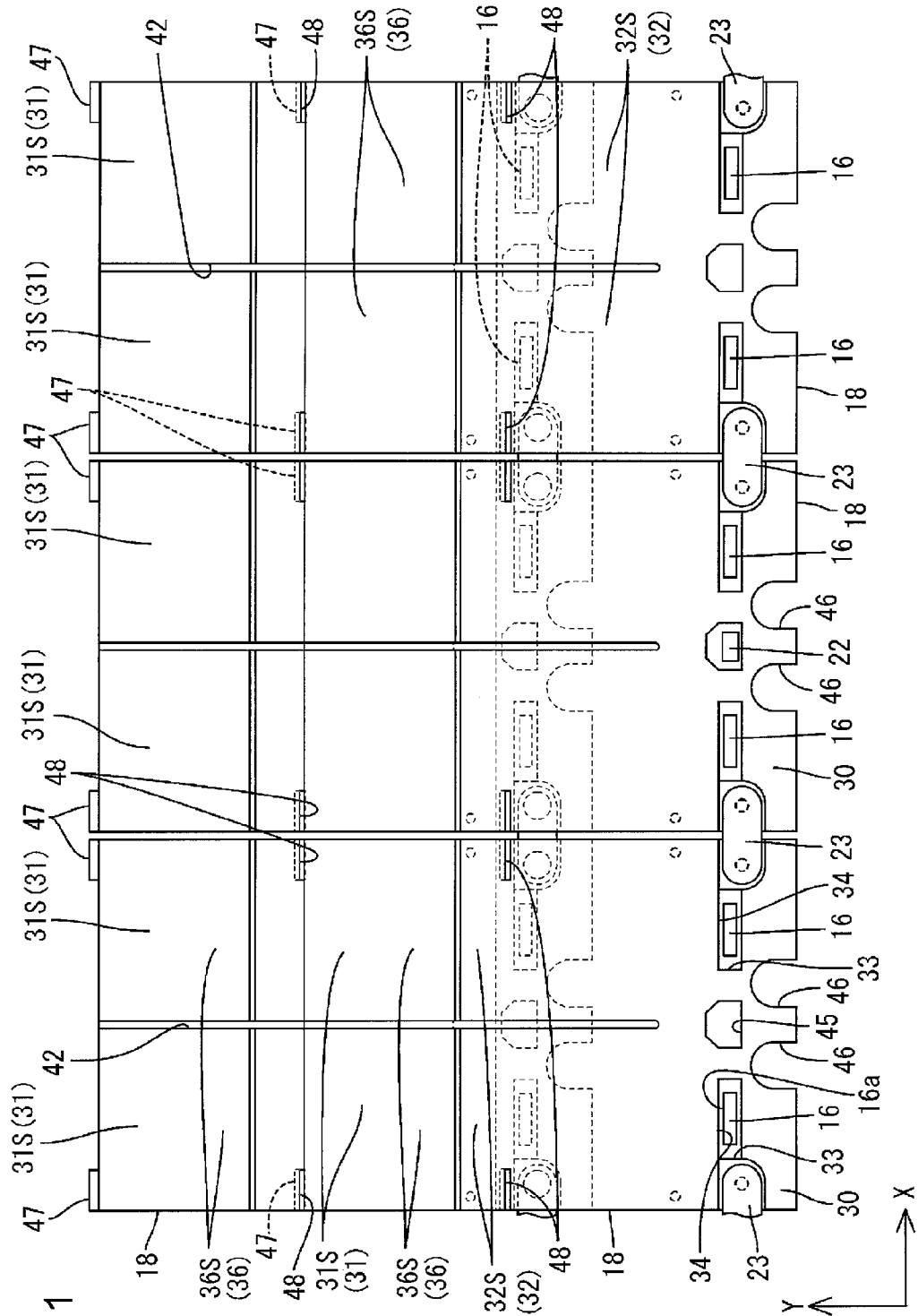
FIG. 11 is a plan view illustrating an arrangement of light guide plates.

Clip insertion holes 43 are formed in the side-end areas of the board mounting portion 30 (in the areas more to the outsides than the LED holding space 33). The clip mounting holes 43 are through holes provided for mounting the light guide plate 18 to the LED board 17. As illustrated in FIG. 6, each clip 23 includes a mounting plate 23a, an insertion post 23b and a pair of stoppers 23c. The mounting plate 23a is parallel to the board mounting portion 30. The insertion post 23b projects from the mounting plate 23a in the thickness direction (the Z-axis direction) of the board mounting portion 30. The stoppers 23c project from an end of the insertion post 23b so as to return toward the mounting plate 23a. The insertion post 23b of the clip 23 is inserted in the clip insertion hole 43 of the board mounting portion 30 and the mounting hole 17a of the LED board 17. The stoppers 23c of the clip 23 are held to the edge portions around the mounting hole 17a. As a result, the light guide plate 18 is mounted and fixed to the LED board 17. As illustrated in FIGS. 5 and 11, one kind of the clips 23 has a single insertion post 23b projecting from the mounting plate 23a and the other kind has two insertion posts 23b projecting from the mounting plate 23a. The first kind of the clips 23 are inserted in the clip insertion holes 43 located in the end areas inside the chassis 14. The other kind of the clips 23 are arranged so as to connect two light guide plates 18 that are parallel to each other and thus the two light guide plates 18 are collectively mountable. As illustrated in FIGS. 6 and 12, clip receiving recesses 44 for receiving the mounting plates 23a of the clips 23 are provided around the clip insertion holes 43. With the clip receiving recesses 44, the mounting plates 23a do not project from the board mounting portions 30 toward the front and thus spaces can be reduced, that is, the thickness of the backlight unit 12 can be reduced.

As illustrated in FIG. 13, each board mounting portion 30 has a photo sensor holding space 45 between the LED holding spaces 33. The photo sensor holding space 45 is a through hole for holding the photo sensor 22 mounted on the LED board 17. A predetermined number of the photo sensors 22 are arranged irregularly, that is, between specific LEDs on the LED boards 17. Namely, some photo sensor holding spaces 45 of the light guide plates 18 in the chassis 14 do not hold the photo sensors 22. Each board mounting portion 30 has a cutout 46 between each LED holding space 33 and the photo sensor holding space 45. The cutouts 46 are located symmetrically. Each cutout 46 runs completely through the board mounting portion 30 similar to the LED holding space 33 but opens on the rear end. A screw (not shown) for fixing the LED board 17 to the chassis 14 is inserted in the cutout 46. Some of the cutouts are not used for light guide plates 18 in the chassis 14, as some photo sensor holding spaces 45 are not used.

As described above, a large number of the light guide plates 18 are placed in a grid and in a planar arrangement within the area of the bottom plate 14a of the chassis 14. The arrangement of the light guide plates 18 will be explained in detail. First, the arrangement in the tandem-arrangement direction (the Y-axis direction) will be explained. As illustrated in FIG. 9, the light guide plates 18 are mounted such that the light guide portions 32 and the light exit portions 31 are separated from the LED boards 17. The light guide portion 32 and the light exit portion 31 of each light guide plate 18 overlap about entire areas of the board mounting portion 30 and the light guide portion 32 of the adjacently located light guide plate 18 on the front side (the upper side in the vertical direction) from the front-surface side (the light output side). In the light guide plates 18 arranged parallel to the tandem-arrangement direction, the light guide plate 18 that is arranged on the relatively rear side (the first light guide plate 18A) is arranged on a front-surface side, that is the light output side (on the diffuser 15b side), and the light guide plate 18 that is arranged on the relatively front side (the second light guide plate 18B) is arranged on a rear-surface side, that is the side opposite from the light output side (the LED substrate 17 side). Namely, the board mounting portion 30 and the light guide portion 32 of the light guide plate 18 on the relatively front side overlap the light guide portion 32 and the light exit portion 31 of the light guide plate 18 on the relatively rear side in the plan view. The board mounting portion 30 and the light guide portion 32, which are the non-luminous portion of the light guide plate 18, are covered with the light guide portion 32 and the light exit portion 31 of the adjacent light guide plate 18. Namely, the board mounting portion 30 and the light guide portion 32 are not bare on the diffuser 15b side and only the luminous portion, that is, the light exit surface 36 of the light exit portion 31 is bare on the diffuser 15b side. With this configuration, the light exit surfaces 36 of the light guide plates 18 are continuously arranged without gaps in the tandem-arrangement direction. About entire rear surfaces of the light guide portion 32 and the light exit portion 31 are covered with the reflection sheet 24. Therefore, even when light is reflected by the light entrance surface 34 and leak occurs, the leak light does not enter the adjacent light guide plate 18 on the rear side. The light guide portion 32 and the light exit portion 31 of the light guide plate 18 on the rear side (the front-surface side) is mechanically supported by the adjacent overlapping light guide plate 18 on the front side (the rear-surface side) from the rear-surface side. The sloped surface 40 of the light guide plate 18 on the front-surface side and the sloped surface 39 on the rear-surface side have substantially same slope angles and are parallel to each other. Therefore, gaps are not created between the overlapping light guide plates 18 and the light guide plates 18 on the rear-surface side support the light guide plates 18 on the chassis 14 side without rattling. Only front side parts of the light guide portions 32 of the light guide plates 18 on the rear side cover the board mounting portions 30 of the light guide plates 18 on the front side. The rear-side parts face the LED boards 17.

The arrangement in a direction perpendicular to the tandem-arrangement direction (the X-axis direction) is illustrated in FIGS. 5 and 12. The light guide plates 18 do not overlap each other in the plan view. They are arranged parallel to each other with predetermined gaps therebetween. With the gaps, air layers are provided between the light guide plates 18 adjacent to each other in the X-axis direction. Therefore, the beams of light does not travel or mix between the light guide plates 18 adjacent to each other in the X-axis direction and thus the light guide plates 18 are optically independent from each other. The size of the gaps between the light guide plates 18 is equal to or smaller than that of the slit 42.

As illustrated in FIGS. 3 and 12, a large number of the light guide plates 18 are arranged in the planar arrangement inside the chassis 14. The light exit surface of backlight unit 12 is formed with a number of the divided light exit portions 31S (the divided light exit surfaces 36S). As described above, the divided light guide portions 32s and the divided light exit portions 31S of the light guide plates 18 are optically independent from each other. Turning on and off of the LEDs 16 are controlled independently. The outgoing light (emission or non-emission of light) from the divided light exit portion 31S can be controlled independently. The driving of the backlight unit 12 can be controlled using an area active technology that provides control of outgoing light for each area. This significantly improves contrast that is very important for display performance of the liquid crystal display device 10.

As described before, the light guide plate 18 is held in a cantilever manner with the board mounting portion 30 as an anchoring point being fixed to the LED board 17 by the clip 23 and a front end as a free end. As illustrated in FIGS. 7 to 9, the light exit portion 31 that is the free end is placed on the front-surface side (the light output side, the diffuser 15b side) of the front-side adjacent light guide plate 18. Vibration may be applied to the backlight unit 12 from outside or the shape or size of each light guide plate 18 may be varied due to manufacturing errors. This may cause variations in relative positions of the light exit portions 31 in the Z-axis direction (the direction perpendicular to the light exit surface 36, the light exit direction) and in relative positions of the light exit portion 31 with respect to the diffuser 15b or the LED 16 (the LED substrate 17) on the front-surface side. This may cause variations in relative positions of the LED 16 and the light entrance surface 34 in the Z-axis direction. This makes the light entrance efficiency of the light beams into the light entrance surface 34 and the light exit efficiency of the light beams from the light exit surface 36 to be unstable, and this may cause uneven brightness in the light guide plates 18.

Figure 14:
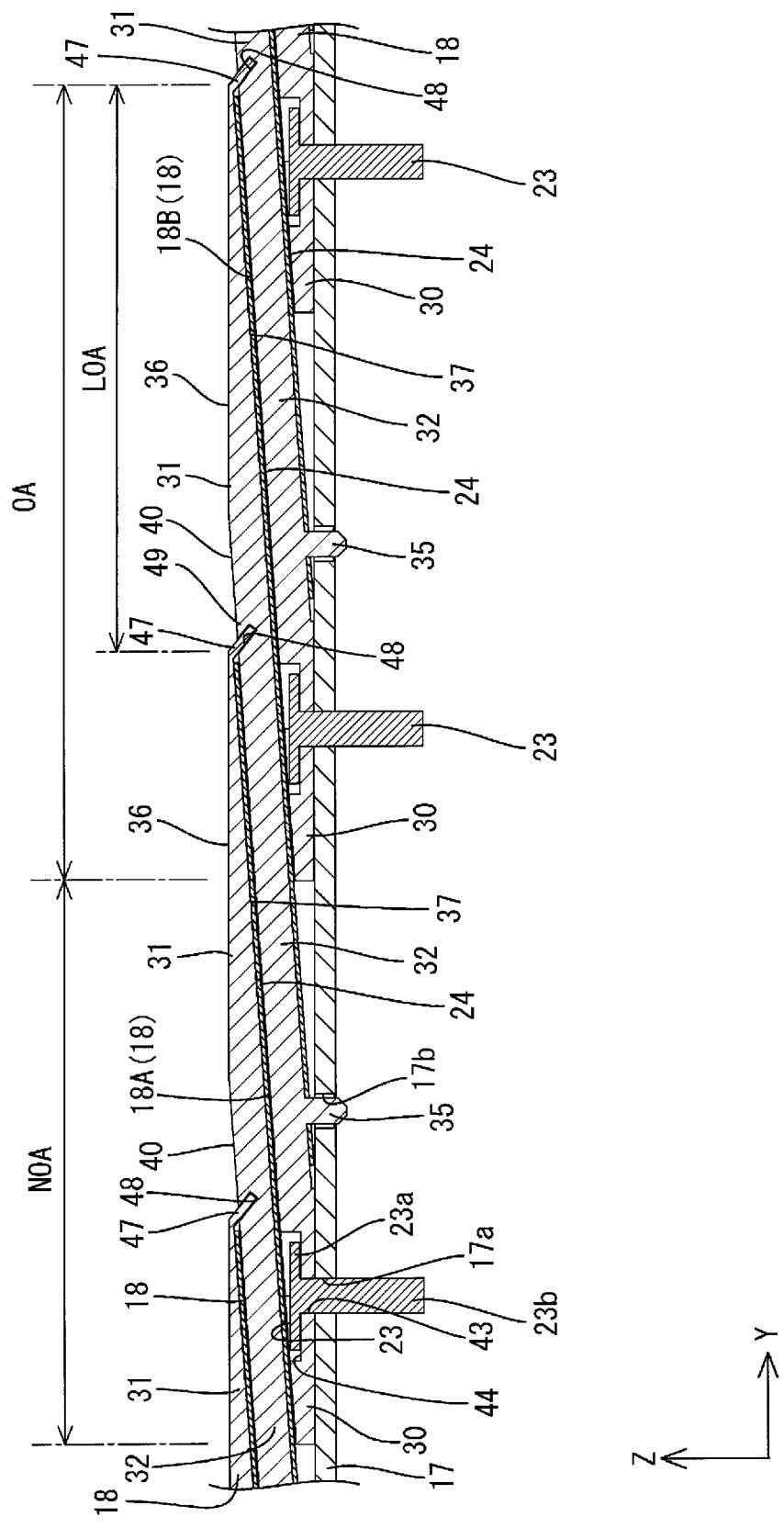
FIG. 14 is a cross-sectional view illustrating a fitting structure of the light guide plate.

In the present embodiment, as illustrated in FIG. 14, the front and rear adjacent light guide plates 18 in the Y-axis direction (in the arrangement direction in which LED 16 and the light entrance surface 34 are arranged) have a fitting structure that connects the adjacent light guide plates 18 each other. This fixes the light exit portion 31 (overlapping area OA) of the rear-side light guide plate 18 (the first light guide plate 18A) to the relatively front-side light guide plate 18 (the second light guide plate 18B). The rear-side light guide plate 18A is placed on the front-side light guide plate 18B. For easy explanation, the light guide plate 18 an entire of which is described in FIG. 14 is referred to as the first light guide plate 18A and the one that is provided on a relatively front side with respect to the first light guide plate 18A and provided on the rear-surface side (on the side opposite from the light output side, on the LED substrate 17 side) is referred to as the second light guide plate 18B. When each of the light guide plates 18 is not distinguished from each other, the numeral 18 without the letters is used.

Specifically, each light guide plate 18 that is arranged in the tandem arrangement along the Y-axis direction is divided into a non-overlapping area NOA and an overlapping area OA. In the non-overlapping area NOA in the relatively rear-side first light guide plate 18A, the entire area of the board mounting portion 30 that is fixed to the LED board 17 by the clip 23 and the rear-side part of the light guide portion 32 does not overlap the second light guide plate 18B provided on a relatively front side in the plan view (are not overlapped in the Z-axis direction (in the direction perpendicular to the light exit surface 36)). In the overlapping area OA of the first light guide plate 18A, the front-side part of the light guide portion 32 and the entire area of the light exit portion 31 overlap the front-side second light guide plate 18B in the plan view (overlapped in the Z-axis direction). Each area of the overlapping area OA and the non-overlapping area NOA illustrated in FIG. 14 is described with reference to the first light guide plate 18A the entire of which is described in FIG. 14. The area of the light exit portion 31 is referred to as the letters LOA in FIGS. 13 and 14.

Figure 15:
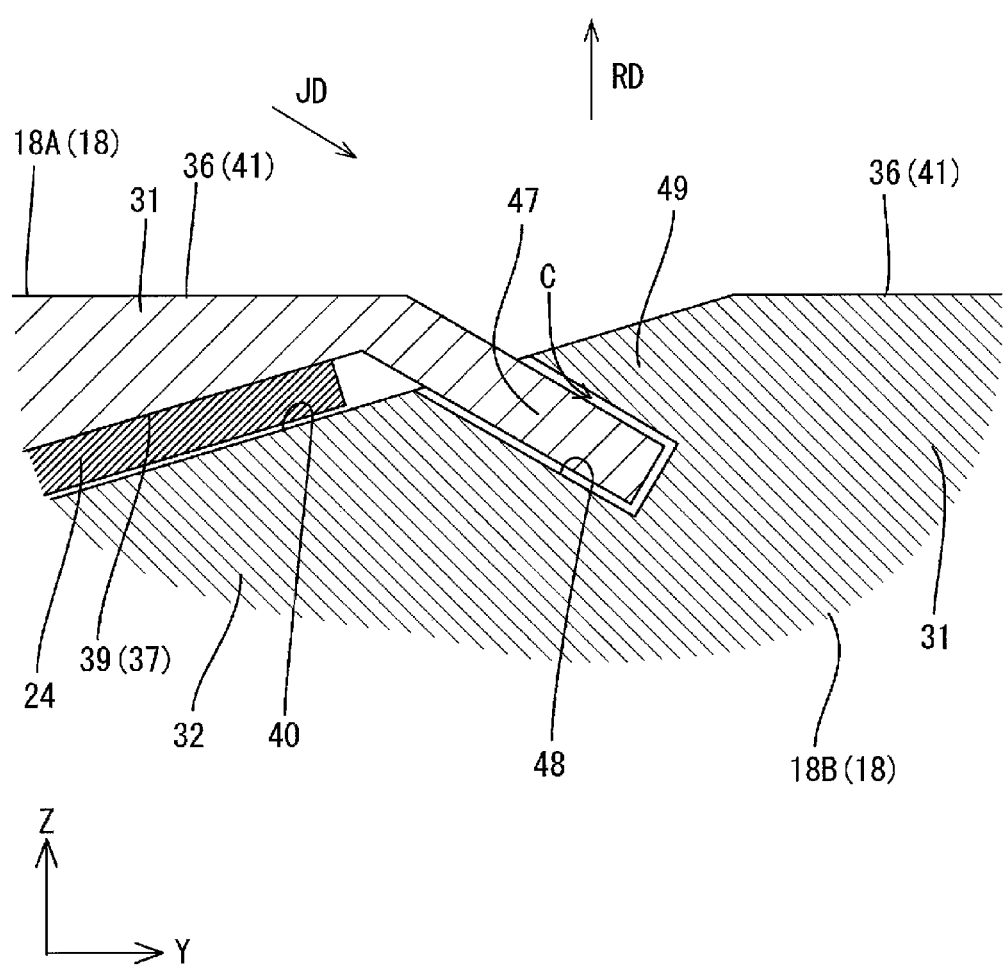
FIG. 15 is a magnified cross-sectional view of the fitting structure.

The first light guide plate 18A provided on the rear side includes a first fitting portion 47 at the front end of the light exit portion 31 that is the overlapping area OA (at the distal end of the light exit portion 31 in the arrangement direction of the LED 16 and the light entrance surface 34). The first fitting portion 47 projects (is formed in a projection) toward the front side as illustrated in FIG. 15. The second light guide plate 18B provided on the front side includes a second fitting portion 48 at the rear end of the light exit potion 31 that is the overlapping area OA. The second fitting portion 47 is formed in a recess and is to be fitted to (to be inserted to, to be slid into, to receive) the first fitting portion 47. The first fitting portion 47 is formed in a projection that projects from the front end of the light exit portion 31 of the first light guide plate 18A toward the diagonally down and right direction in FIG. 14. The projection of the first fitting portion 47 projects with angled with respect to the Y-axis direction and the Z-axis direction toward the front side and the rear-surface side (the side opposite from the light output side, the LED board 17 side). The first fitting portion 47 is angled to form an obtuse angle with the front-surface-side sloped surface 40 of the adjacent front-side second light guide plate 18B and cross the sloped surface 40. The second fitting portion 48 is formed in a recess at the rear end of the light exit portion 31 of the second light guide plate 18B. The recess of the second fitting portion 48 is open toward the diagonally upward and left direction in FIG. 14, that is toward the rear side and the front-surface side (the light output side, the diffuser 15b side). The recess opens with angled with respect to the Y-axis direction and the Z-axis direction. The second fitting portion 48 is formed in the sloped surface 40 on the front-surface side so as to be angled to form an obtuse angle with the sloped surface 40 and cross the sloped surface 40. The first fitting portion 47 is fitted to the second fitting portion 48 along almost the Y-axis direction (the direction represented by an arrow JD in FIG. 15), that is a direction crossing to the light exit surface 36 (diagonally). The fitting direction JD corresponds to the projecting direction of the first fitting portion 47 and the second fitting portion 48 is open so as to receive the first fitting portion 47.

The upper portion (in FIG. 15) of the surrounding part of the second fitting portion 48 formed in the recess functions as a stopper 49. The upper portion corresponds to the portion of the second fitting portion 48 provided on the front-surface side (the light output side, the diffuser 15b side) from the fitted first fitting portion 47. The stopper 49 is fit to the first fitting portion 47 so that the light exit portion 31 (the overlapping area OA) of the rear-side first light guide plate 18A is less likely to move relatively with respect to the front-side second light guide plate 18B. The stopper 49 covers the first fitting portion 47 from the front-surface side so as to overlap the first fitting portion 47 in the plan view. The inner surface of the stopper 49 is fitted to the outer surface of the first fitting portion 47. This fitting is less likely to cause the first fitting portion 47 to move relatively in the Z-axis direction (the light output direction, the direction perpendicular to the light exit surface 36) with respect to the second fitting portion 48. This is less likely to cause the light exit portion 31 that is the free end of the rear-side first light guide plate to move relatively in the Z-axis direction with respect to the front-side second light guide plate 18B. Therefore, the light exit portion 31 is positioned with respect to the Z-axis direction. A cross section of the second fitting portion 48 is slightly greater than that of the first fitting portion 47. A predetermined gap C is provided between the fitting portions 47 and 48 when the first fitting portion 47 is fitted to the second fitting portion 48.

As illustrated in FIG. 14, the first fitting portion 47 and the second fitting portion 48 are provided in each of the series of light guide plates 18 arranged in the Y-axis direction. Each of the series of light guide plates 18 provided in the tandem arrangement has the first fitting portion 47 and the second fitting portion 48 and has a same structure. The first fitting portion 47 of a predetermined light guide plate 18 of the series of light guide plates 18 provided in the tandem arrangement is fitted to the second fitting portion 48 of the front-side adjacent light guide plate 18. This is less likely to cause the light exit portion 31 of the predetermined light guide plate 18 to move relatively in the front-surface side. At the same time, the first fitting portion 47 of the rear-side adjacent light guide plate 18 is fitted to the second fitting portion 48 of the predetermined light guide plate 18. This is less likely to cause the light exit portion 31 of the adjacent light guide plate 18 on the rear side to relatively move toward the front-surface side. Namely, each light guide plate 18 functions as the first light guide plate 18A and also as the second light guide plate 18B. In each of the light guide plates 18 provided in the tandem arrangement, the corresponding first fitting portions 47 are fitted to the corresponding second fitting portions 48, and this is less likely to cause the rattling of each light exit portion 31 on the front-surface side.

Two first fitting portions 47 and two second fitting portions 48 are provided on either end of each light guide plate 18 respectively with respect to the X-axis direction, that is the direction perpendicular to the arrangement direction of the LED 16 and the light entrance surface 34 and parallel to the light exit surface 36. Specifically, each first fitting portion 47 and each second fitting portion 48 is provided at the outer end of the divided light exit portion 31S with respect to the X-axis direction (on the side opposite from the slit 42 side).

Each of the light guide plates 18 is assembled to the LED substrate 17 on which each LED 16 is arranged in the manufacturing process of the backlight unit 12. Specifically, after each LED board 17 is provided in a predetermined position on the bottom plate 14a of the chassis 14 (FIG. 3), the light guide plate 18 is provided in the position on each LED board 17 so as to correspond to each LED 16. First, one of the light guide plates 18 is mounted in a position corresponding to the LED 16 in the upper end area (the front end area) of the bottom plate 14a of the chassis 14 with respect to the vertical direction (the tandem-arrangement direction, the Y-axis direction). Then, the other light guide plates 18 are mounted in sequence corresponding to the LEDs 16 located lower in the vertical direction (or on the rear) (see FIGS. 7 to 9). The light guide plates 18 mounted second or later partially overlap the light guide plates 18 adjacently located on the upper side in the vertical direction from the front. As a result, the light guide plates 18 are overlaid and mounted in the tandem arrangement along the vertical direction.

Mounting of the light guide plates 18 mounted second or later will be explained in detail. The first fitting portion 47 provided at the front of the first light guide plate 18A is positioned to correspond to the second fitting portion 48 of the front-side adjacent second light guide plate 18B and they are fitted to each other in the direction represented by the arrow JD in FIG. 15. The fitting is performed easily without requiring great power due to the predetermined gap C between the first fitting portion 47 and the second fitting portion 48. The fitting is performed so that each LED 16 is put in the corresponding LED holding space 33 and each clip insertion hole 43 corresponds to each mounting hole 17a (FIG. 14). Then, the insertion post 23b of the clip 23 is inserted to the clip insertion hole 43 and the mounting hole 17a from the front-surface side. The stoppers 23c are held to the edge portions around the mounting hole 17a of the LED board 17 from the rear-surface side. As a result, the first light guide plate 18A is mounted and fixed to the LED board 17. The above-described operation is performed in sequence and a series of the light guide plates 18 are arranged in the Y-axis direction as illustrated in FIG. 14.

After the light guide plates 18 are mounted to the LED boards 17, the other components are assembled. Then, assembly of the backlight unit 12 and the liquid crystal display device 10 is completed (FIGS. 4 to 9). When the liquid crystal display device 10 is turned on and the LEDs 16 are lit, the beams of light emitted through a light-emitting surface 16a of each LED 16 strike the light entrance surface 34. The light enters the light guide plate 18 through the light entrance surface 34 travels through the light guide portion 32 toward the light exit portion 31 while totally reflects off the interface between the light guide plate 18 and the air layer. With this configuration, the light is less likely to leak to the external space. During traveling through the light guide portion 32, the beams of light in different colors of red, green and blue from the LED chips 16c of the LED 16 are mixed and white light is produced. The white light is scattered sufficiently in the X-axis direction and the Y-axis direction. The light that reaches the light exit portion 31 is scattered by the scattering surface 37 formed on the surface opposite from the light exit surface 36 and reflected by the reflection sheet 24 arranged on the further rear-surface side than the scattering surface 37. Namely, the light is guided to the light exit surface 36. Such light scattered by the scattering surface 37 and reflected by the reflection sheet 24 toward the upper side includes beams that strike the light exit surface 36 at angles smaller than the critical angle. Such beams of the light exit the light guide plate 18 through the light exit surface 36 to the external space. The beams that strike the light exit surface 36 at angles larger than the critical angle are totally reflected by the light exit surface 36 and scattered by the scattering surface 37. The beams repeat such moves and finally exit from the light exit surface 36. The light exit the light guide plate 18 is evenly scattered in a plane created by all of the light exit surfaces 36 in the backlight unit 12. The light is converted to planar light and illuminates the liquid crystal panel 11.

As illustrated in FIG. 14, the first fitting portions 47 and the second fitting portions 48 are provided in the light exit portion 31 of each light guide plate 18. The first fitting portions 47 and the second fitting portions 48 may be obstacles in optical paths of the beams of light traveling through the light guide plate 18. However, the first fitting portions 47 and the second fitting portions 48 are provided in either end of the light guide plate 18 (the light exit surface 36) in the X-axis direction. The first and second fitting portions 47, 48 are less likely to be distinct on the light guide plate 18 compared to the case in which they are provided in the middle. Therefore, even if any optical error such as a dark portion is generated in the areas of the light exit surface 36 in which the first fitting portions 47 and the second fitting portions 48 are provided, the optical error is less likely to be distinct.

In the present embodiment, the first fitting portions 47 and the second fitting portions 48 that are to be fitted to each other are provided as the fitting structure on each of the light guide plates 18 that are arranged in series along the tandem-arrangement direction. While the backlight units 12 are moved during the manufacturing process or the completed liquid crystal display devices 10 are transported, vibration may be applied thereto from outside. In such a case, as illustrated in FIG. 15, the first fitting portion 47 is pressed from the front-surface side by the stopper 49 of the second fitting portion 48. This restricts the light exit portion 31 that is a free end of each light guide plate 18 from moving to the front-surface side in the Z-axis direction with respect to the adjacent light guide plate 18 (moving in the direction of the arrow RD in FIG. 15). In assembling the light guide plates 18, the first fitting portions 47 are fitted to the second fitting portions 48 respectively so that the stoppers 49 press the first fitting portion 47 from the front-surface side and the board mounting portion 30 is fixed to the LED board 17 by the clips 23. The shape or the size of each light guide plate 18 may not be same due to the manufacturing errors caused in the manufacturing process of the light guide plates 18. Even in such a case, the positions of the light guide plates 18 are corrected and this standardizes the mounting of the light guide plates 18. The above fitting structure maintains constant relative positions of the light exit portions 31 of the light guide plates 18 in the Z-axis direction. This stabilizes the relative positions of the light entrance surfaces 34 and the LEDs 16 in the Z-axis direction and also stabilizes the light entrance efficiency of the light beams into the light entrance surfaces 34 and the light exit efficiency of the light beams from the light exit surfaces 36. Accordingly, uneven brightness is less likely to be caused in the light guide plates 18 and uneven brightness is less likely to be caused in the backlight unit 12.

As is explained above, the backlight unit 12 of the present embodiment includes the LEDs 16, the first light guide plate 18A and the second light guide plate 18B, and the fitting structure. Each of the first light guide plate 18A and the second light guide plate 18B has a light entrance surface 34 and a light exit surface 36. The light entrance surface 34 is provided to face the LED 16 and beams of light from the LED 16 strike the light entrance surface 34. The light exit surface 36 is provided to extend in the arrangement direction in which the LED 16 and the light entrance surface 34 are arranged and the beams of light exit therefrom. The first light guide plate 18A and the second light guide plate 18B are provided in series along the arrangement direction so as to partially overlap each other in the direction crossing the light exit surface 36. The fitting structure is provided on each of the first light guide plate 18A and the second light guide plate 18B. The first light guide plate 18A is provided on a relatively light exit side and the second light guide plate 18B is provided on an opposite side from the relatively light exit side. The first light guide plate 18A includes the light exit portion 31 that is the overlapping area OA. The fitting structure is less likely to cause the light exit portion 31 of the first light guide plate 18A to move relatively to the light exit side with respect to the second light guide plate 18B.

The first light guide plate 18A is provided on a relatively light exit side and the second light guide plate 18B is provided on an opposite side from the relatively light exit side. The first light guide plate 18A includes the light exit portion 31 that is the overlapping area OA. The fitting structure is less likely to cause the light exit portion 31 to move relatively to the light exit side with respect to the second light guide plate 18B. Vibration may be applied to the light guide plates 18 from outside or the shape or the size of each light guide plate 18 may be varied due to the manufacturing errors caused in the manufacturing process of the light guide plates 18. Even in such a case, the relative positions of the LED 16 and the light entrance surface 34 are less likely to be changed. This stabilizes the light entrance efficiency of the light beams into the light entrance surface 34 and uneven brightness is less likely to be cased in the light guide plates 18. In the backlight unit 12 and the liquid crystal display device 10 that are thin, if the relative positions of the LED 16 and the light entrance surface 34 are slightly changed, the light entrance efficiency of the light beams into the light entrance surface 34 and the brightness are significantly changed. Therefore, the above structure is especially effective for the thin devices. Accordingly, uneven brightness is less likely to be caused.

The fitting structure includes the first fitting potion 47 and the second fitting portion 48. The first fitting portion 47 is provided on the light exit portion 31 that is the overlapping area OA of the first light guide plate 18A and the second fitting portion 48 is provided on the second light guide plate 18B and fitted to the first fitting portion 47. Due to the fitting of the first fitting portion 47 and the second fitting portion 48, the light exit portion 31 that is the overlapping area OA of the first light guide plate 18A is less likely to move relatively to the light exit side with respect to the second light guide plate 18B.

The second fitting portion 48 includes the stopper 49 that is provided on the light exit side from the first fitting portion 47 and to be fit to the first fitting portion 47. Accordingly, the first fitting portion 47 is fitted to the second fitting portion 48 and the stopper 49 is also fitted to the first fitting portion 47 from the light output side. This does not cause the relative movement of the light exit portion 31 that is the overlapping area OA of the first light guide plate 18A.

The gap C is provided between the first fitting portion 47 and the second fitting portion 48. This improves the fitting of the first fitting portion 47 and the second fitting portion 48.

On the first light guide plate 18A, the clip 23 is provided in the board mounting portion 30 that is the non-overlapping area NOA. The non-overlapping area NOA does not overlap the second light guide plate 18B. The clip 23 is provided to fix the first light guide plate 18A to the LED board 17. The non-overlapping area NOA (the board mounting portion 30 and the rear side portion of the light guide portion 32) that is fixed by the clip 23 and the overlapping area OA (the front side portion of the light guide portion 32 and the light exit portion 31) including the first fitting portion 47 are provided in the arrangement direction in which the LED 16 and the light entrance surface 34 are arranged. Accordingly, the first light guide plate 18A is held in a cantilever manner with the non-overlapping area NOA being fixed to the LED board 17 by the clip 23. The non-overlapping area NOA and the overlapping area OA are provided along the arrangement direction. The overlapping area OA is less likely to cause the relative movement of the overlapping area OA toward the light exit side by the fitting of the first fitting portion 47 and the second fitting portion 48.

The first fitting portion 47 is provided at the front end of the light exit portion 31 that is the overlapping area OA in the arrangement direction. This does not cause the relative movement of the light exit portion 31 that is the overlapping area OA toward the light exit side.

Each of the first light guide plate 18A and the second light guide plate 18B includes a set of the first fitting portion 47 and the second fitting portion 48. A large number of the sets are provided in the arrangement direction. Accordingly, the first light guide plate 18A and the second light guide plate 18B have the same structure and this reduces a cost. The light guide plates 18 are easily arranged in series and this is preferable for increasing the size of devices.

The fitting structure is provided at the ends (the front end) of the first light guide plate 18A and the second light guide plate 18B in the direction perpendicular to the arrangement direction of the LED 16 and the light entrance surface 34 and parallel to the light exit surface 36. This mostly prevents the fitting structure from being optical obstacles on the first light guide plate 18A and the second light guide plate 18B.

A pair of fitting structures is provided on the either end of the first light guide plate 18A and the second light guide plate 18B in the direction perpendicular to the arrangement direction and on the plane parallel to the light exit surface 36. Accordingly, the light exit portion 31 that is the overlapping area OA on the first light guide plate 18A is stably suppressed from moving relatively to the light output side by a pair of fitting structures.

The first light guide plates 18A and the second light guide plates 18B are provided in series along the direction parallel to the light exit surface 36 and crossing to the arrangement direction in which the LED 16 and the light entrance surface 34 are arranged. This is less likely to cause uneven brightness in each light guide plate 18 and the backlight unit 12 including the light exit surfaces 36 that are arranged in series two-dimensionally.

Second Embodiment

The second embodiment of the present invention will be explained with reference to FIG. 16. In the second embodiment, first fitting portions 47-A and second fitting portions 48-A are formed in different shapes. Similar parts to the first embodiment will be indicated by the same symbols followed by -A. The same configurations, functions and effects will not be explained.

Figure 16:
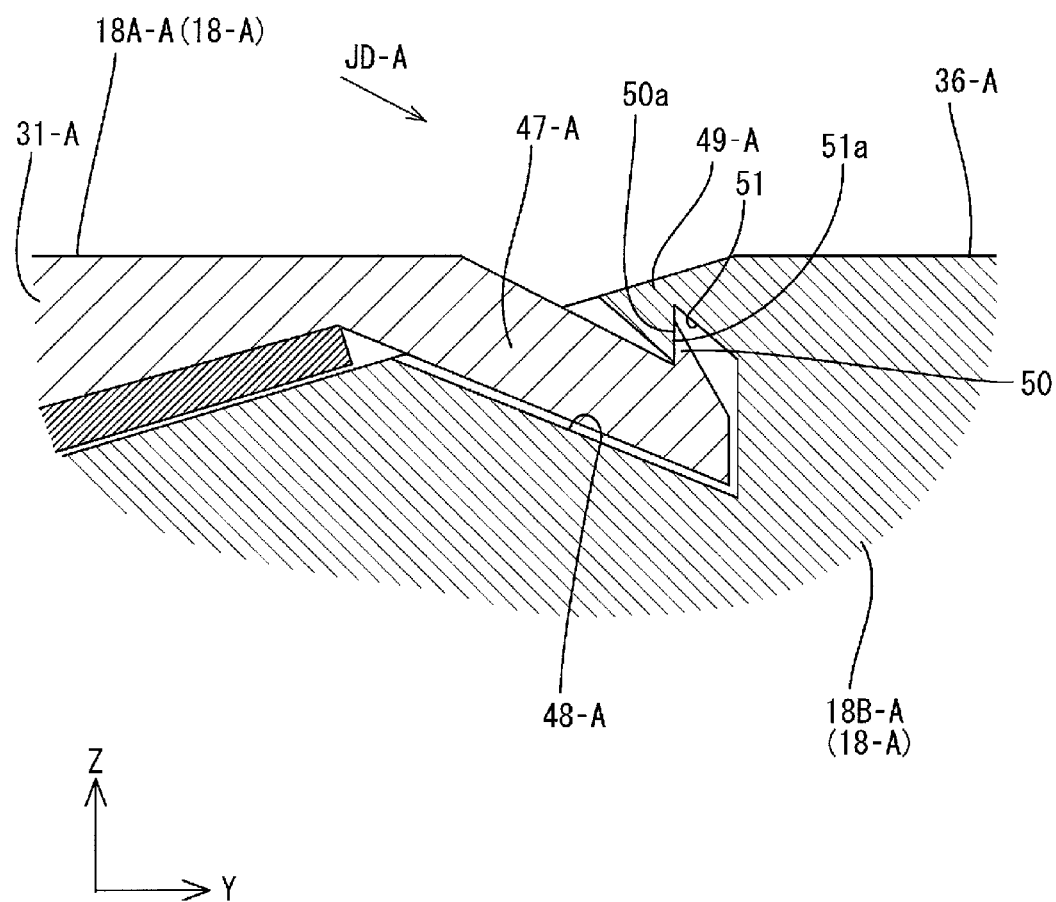
FIG. 16 is a magnified cross-sectional view of a fitting structure according to a second embodiment of the present invention.

As illustrated in FIG. 16, a stopper projection 50 is provided on a front end of the first fitting portion 47-A so as to project in the front-surface side. A stopper recess 51 is formed on a front end of a stopper 49-A of the peripheral portion of a second fitting portion 48-A that is provided on the front-surface side with respect to the first fitting portion 47-A. The stopper recess 51 is formed to receive the stopper projection 50. A rear end surface 50a of the stopper projection 50 is engaged to a rear end surface 51a of the stopper recess 51. Due to this engagement, the first fitting portion 47-A is less likely to relatively move so as to be removed from the second fitting portion 48-A. Namely, the first fitting portion 47-A is less likely to move relatively in the direction opposite from the fitting direction (represented by an arrow JD-A in FIG. 16). The rear surfaces 50a, 51a of the stopper projection 50 and the stopper recess 51 that are engaged to each other are substantially parallel to the Z-axis direction and crossing the fitting direction of the first fitting portion 47-A and the second fitting portion 48-A. In FIG. 16, the light guide plate 18-A on the rear side is a first light guide plate 18A-A and the light guide plate 18-A on the front side is a second light guide plate 18B-A.

As explained above, according to the present embodiment, the fitting direction of the first fitting portion 47-A and the second fitting portion 48-A crosses the light exit surface 36-A. The first fitting portion 47-A and the second fitting portion 48-A include the stopper projection 50 and the stopper recess 51 respectively as a retaining structure. The stopper projection 50 and the stopper recess 51 are engaged to each other and this engagement is less likely to cause the relative movement of the first fitting portion 47-A and the second fitting portion 48-A in the direction opposite from the fitting direction (represented by the arrow JD-A). Accordingly, the retaining structure prevents the first fitting portion 47-A from being removed from the second fitting portion 48-A and this further reliably restricts the relative movement of the light exit portion 31-A (overlapping portion) of the first light guide plate 18A-A.

Third Embodiment

The third embodiment of the present invention will be explained with reference to FIG. 17. In the third embodiment, first fitting portions 47-B and second fitting portions 48-B are formed in different shapes from the first embodiment. Similar parts to the first embodiment will be indicated by the same symbols followed by -B. The same configurations, functions and effects will not be explained.

Figure 17:
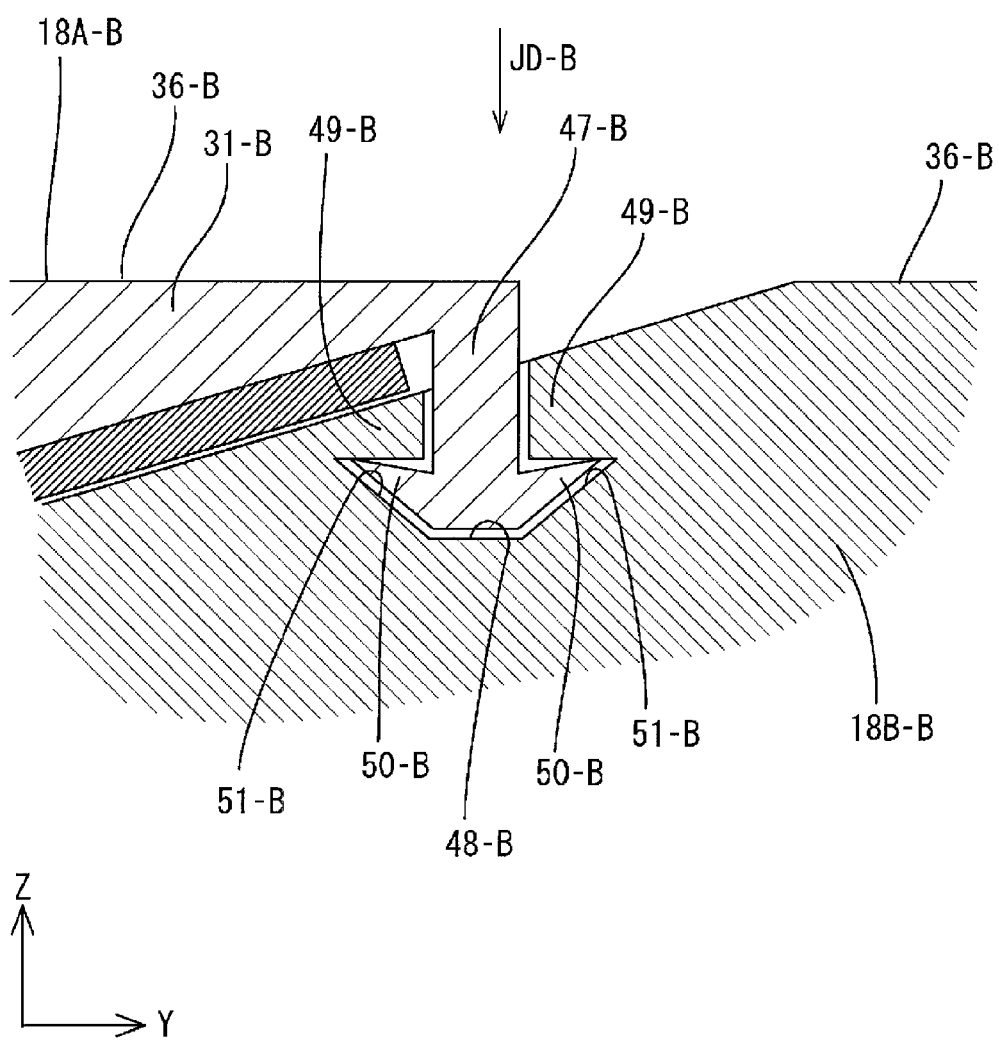
FIG. 17 is a magnified cross-sectional view of a fitting structure according to a third embodiment of the present invention.

As illustrated in FIG. 17, the first fitting portion 47-B is formed to be bent substantially vertically to the rear-surface side (the side opposite from the light output side) along the Z-axis direction from the front end of a light guide portion 31-B of a first light guide plate 18A-B. The second fitting portion 48-B is formed to be open toward the front-surface side along the Z-axis direction. Therefore, the fitting direction of the first fitting portion 47-B to the second fitting portion 48-B is substantially same as the Z-axis direction (the direction perpendicular to the light exit surface 36-B) as represented by an arrow JD-B in FIG. 17. The first fitting portion 47-B and the second fitting portion 48-B are provided on the rear side with respect to a light exit portion 31-B that integrally includes the first fitting portion 47-B, that is, on the side opposite from the light output side. Namely, the first fitting portion 47-B and the second fitting portion 48-B are covered with the light exit portion 31-B so as not to expose to the front-surface side.

A pair of stopper projections 50-B is provided at the distal end of the first fitting portion 47-B so as to project in the Y-axis direction. A pair of stopper recesses 51-B is formed on the bottom portion of the second fitting portion 48-B so as to expand in the Y-axis direction and receive the stopper projections 50-B. Portions of the surrounding parts of the stopper recess 51-B provided on the front-surface side (the light output side) with respect to the stopper projection 50B are stoppers 49-B that are fitted to the stopper projections 50-B respectively. When the first fitting portion 47-B is fitted to the second fitting portion 48-B, the stopper projections 50-B are engaged to the stoppers 49-B. This is less likely to cause the light exit portion 31-B integrally including the first fitting portion 47-B to move relatively to the front-surface side with respect to the font-side second light guide plate 18B-B. Also, this is less likely to cause the first fitting portion 47-B to move relatively to the direction so as to be removed from the second fitting portion 48-B, that is the direction opposite from the fitting direction.

As explained above, according to the present embodiment, the fitting direction of the first fitting portion 47-B and the second fitting portion 48-B is perpendicular to the light exit surface 36-B. The stoppers 49-B functions as the retaining structure. The stoppers 49-B restrict the relative movement of the first fitting portion 47-B and the second fitting portion 48-B in the direction opposite from the fitting direction. Accordingly, the stoppers 49-B have the relative movement restriction function that restricts the relative movement of the light exit portion 31-B (the overlapping area) of the first light guide plate 18A-B and the retaining function that prevents the removal of the first fitting portion 47-B from the second fitting portion 48-B. This simplifies the structure.

The light exit portion 31-B that is an overlapping portion of the first light guide plate 18A-B includes a light exit surface 36-B. The first fitting portion 47-B and the second fitting portion 48-B are provided on a side opposite of the light exit surface 36-B from the light exit portion 31-B so as to be overlapped therewith. The light exit portion 31-B is an overlapping area of the first light guide plate 18A-B. Accordingly, the first fitting portion 47-B and the second fitting portion 48-B are not exposed to the light exit surface 36-B side. Therefore, the first fitting portion 47-B and the second fitting portion 48-B are not optical obstacles to the light exit surface 36-B.

Forth Embodiment

The fourth embodiment of the present invention will be explained with reference to FIG. 18. In the fourth embodiment, first fitting portions 47-C and second fitting portions 48-C are formed in different shapes from the third embodiment. Similar parts to the third embodiment will be indicated by the same symbols followed by -C. The same configurations, functions and effects will not be explained.

Figure 18:
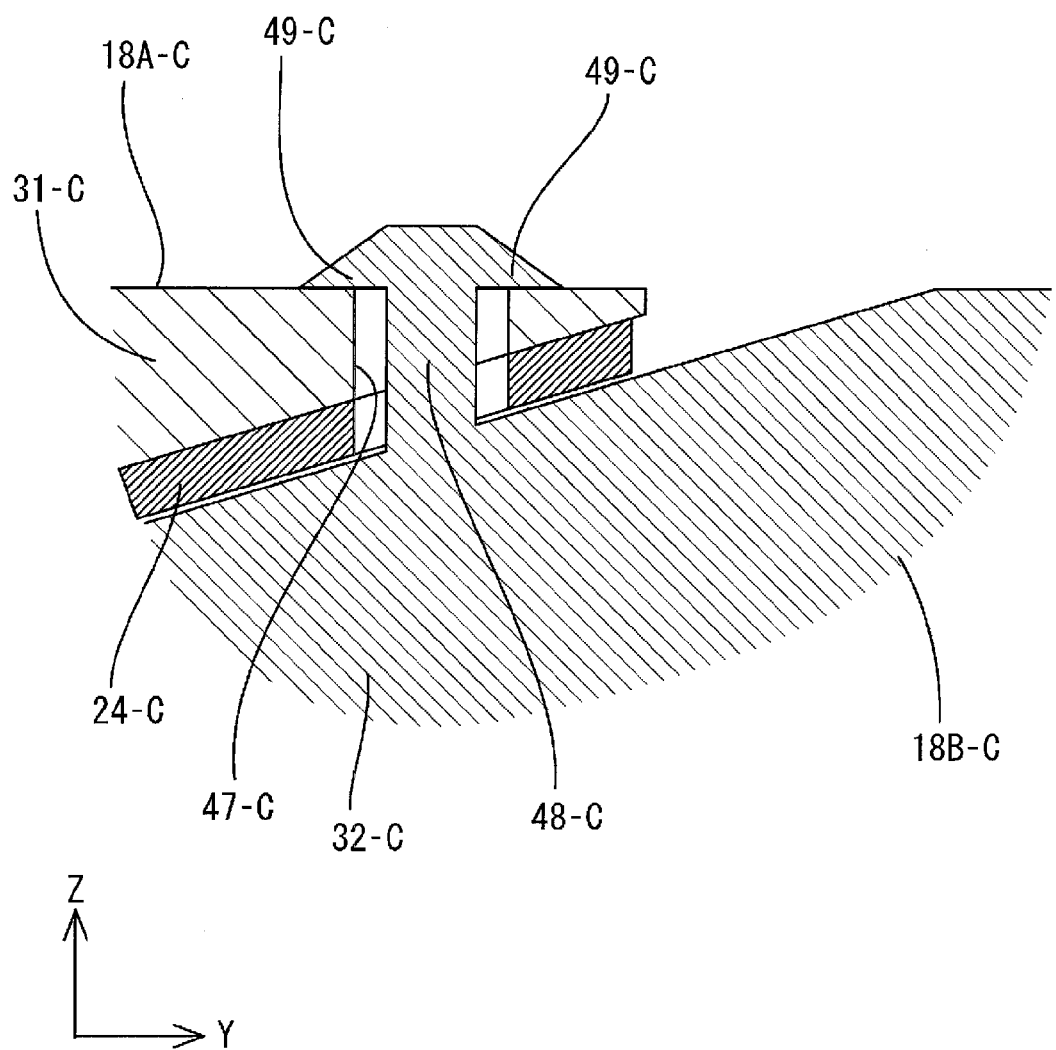
FIG. 18 is a magnified cross-sectional view of a fitting structure according to a fourth embodiment of the present invention.

As illustrated in FIG. 18, the first fitting portion 47-C is formed to be a hole (a recess) that is a through hole that runs substantially straight at the front end of the light exit portion 31-C of the first light guide plate 18A-C in the Z-axis direction. A through hole in connection with the first fitting portion 47-C is formed in a reflective sheet 24-C. The second fitting portion 48-C is provided on a light guide portion 32-C of the front-side second light guide plate 18B-C. The light guide portion 32-C of the second light guide plate 18B-C overlaps the light exit portion 31-C of the rear-side first light guide plate 18A-C in the plan view. The second fitting portion 48-C is formed to project substantially straight from the light guide portion 32-C to the front-surface side along the Z-axis direction. Stoppers 49-C are provided at projected distal ends of the second fitting portion 48-C so as to be spread in the Y-axis direction. The stoppers 49-C are engaged to the corresponding edge of the first fitting portion 47-C. Accordingly, the light exit portion 31-C integrally including the first fitting portion 47-C is less likely to move relatively to the front-surface side.

Fifth Embodiment

The fifth embodiment of the present invention will be explained with reference to FIG. 19. In the fifth embodiment, arrangement of the fitting structure is changed from the first embodiment. Similar parts to the first embodiment will be indicated by the same symbols followed by -D. The same configurations, functions and effects will not be explained.

Figure 19:
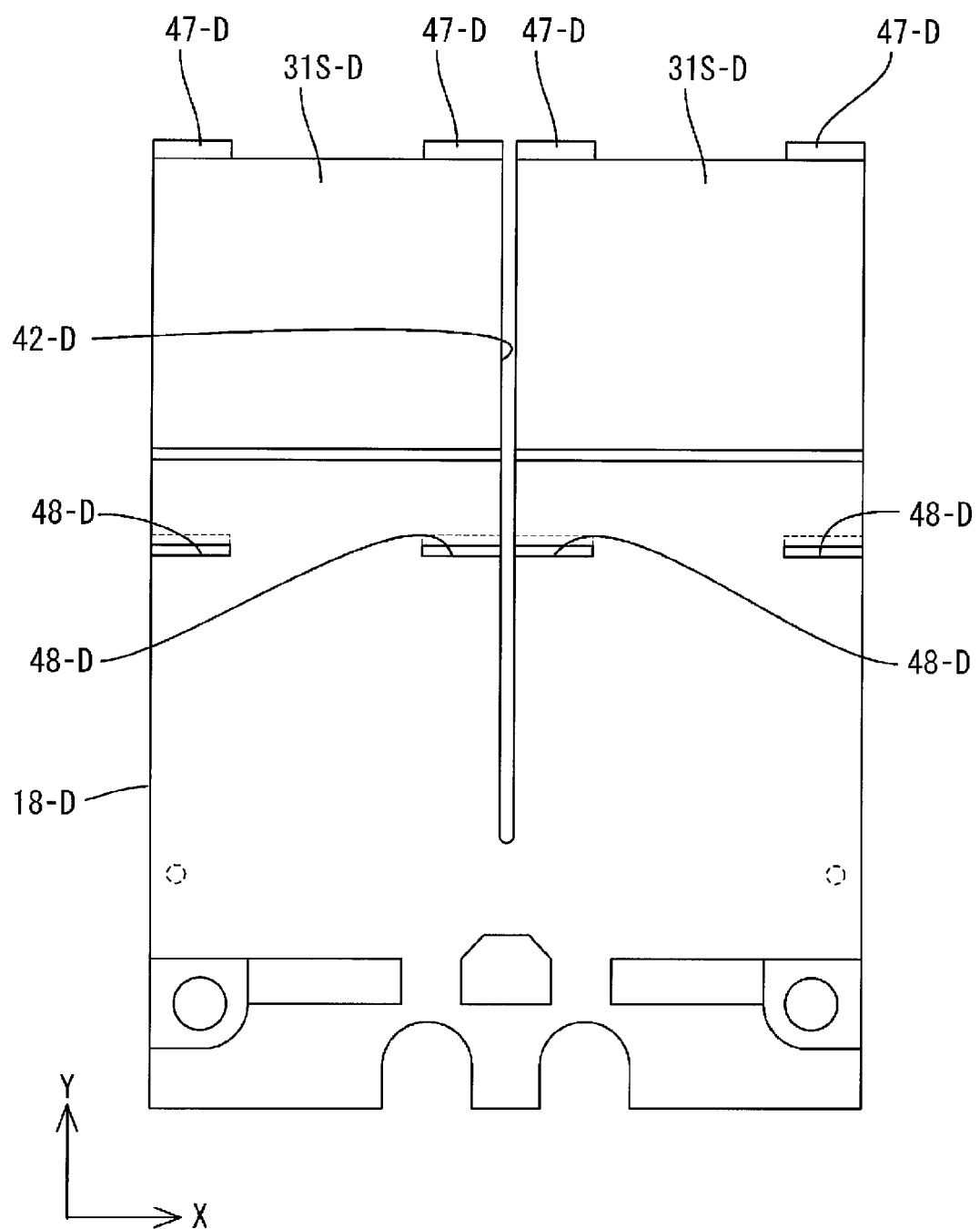
FIG. 19 is a plan view of a light guide plate according to a fifth embodiment of the present invention.

As illustrated in FIG. 19, a set of a first fitting portion 47-D and a second fitting portion 48-D forming a fitting structure is provided on either side of each divided light exit portion 31S-D on the light guide plate 18-D in the X-axis direction. The light guide plate 18-D is divided into divided light exit portions 31S-D by a slit 42-D. Four sets of the first fitting portions 47-D and the second fitting portions 48-D are provided on the light guide plate 18-D. With such an arrangement, the rattling is less likely to be caused in either end of the each divided light exit portion 31S-D in the X-axis direction with balance. Accordingly, each divided light exit portion 31S-D is stably fixed and this contributes to even brightness.

Sixth Embodiment

The sixth embodiment of the present invention will be explained with reference to FIG. 20. In the sixth embodiment, arrangement of the fitting structure is changed from the fifth embodiment. Similar parts to the fifth embodiment will be indicated by the same symbols followed by -E. The same configurations, functions and effects will not be explained.

Figure 20:
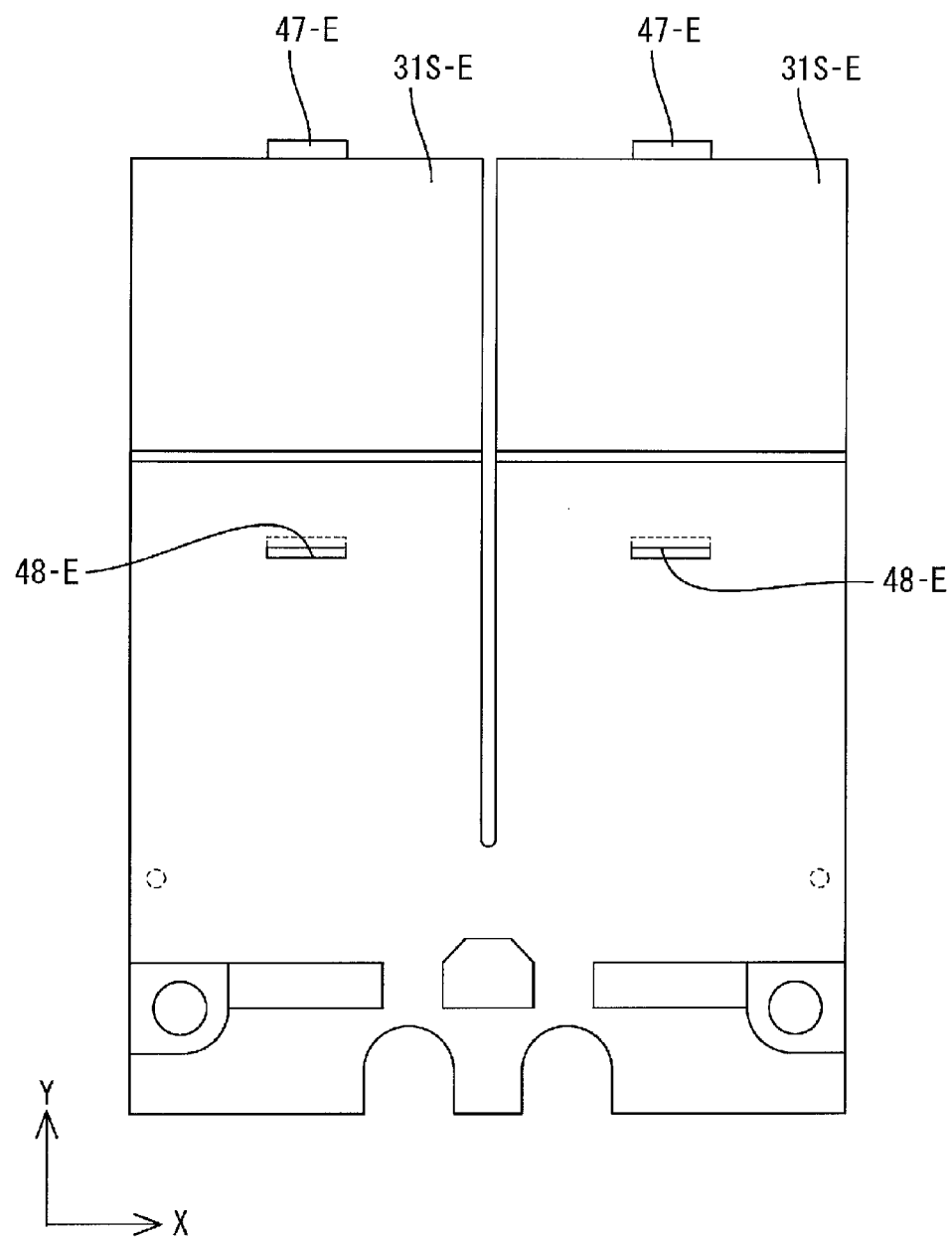
FIG. 20 is a plan view of a light guide plate according to a sixth embodiment of the present invention.

As illustrated in FIG. 20, a first fitting portion 37-E and a second fitting portion 48-E forming a fitting structure are provided in a middle portion of each divided light exit portion 31S-E in the X-axis direction. With such an arrangement, the rattling is less likely to be caused in each divided light exit portion 31S-E in the X-axis direction with balance. Accordingly, each divided light exit portion 31S-E is stably fixed.

Seventh Embodiment

The seventh embodiment of the present invention will be explained with reference to FIG. 21 or FIG. 22. In the seventh embodiment, first fitting portions 47-F and second fitting portions 48-F are formed in different shapes from the first embodiment. Similar parts to the first embodiment will be indicated by the same symbols followed by -F. The same configurations, functions and effects will not be explained.

Figure 21:
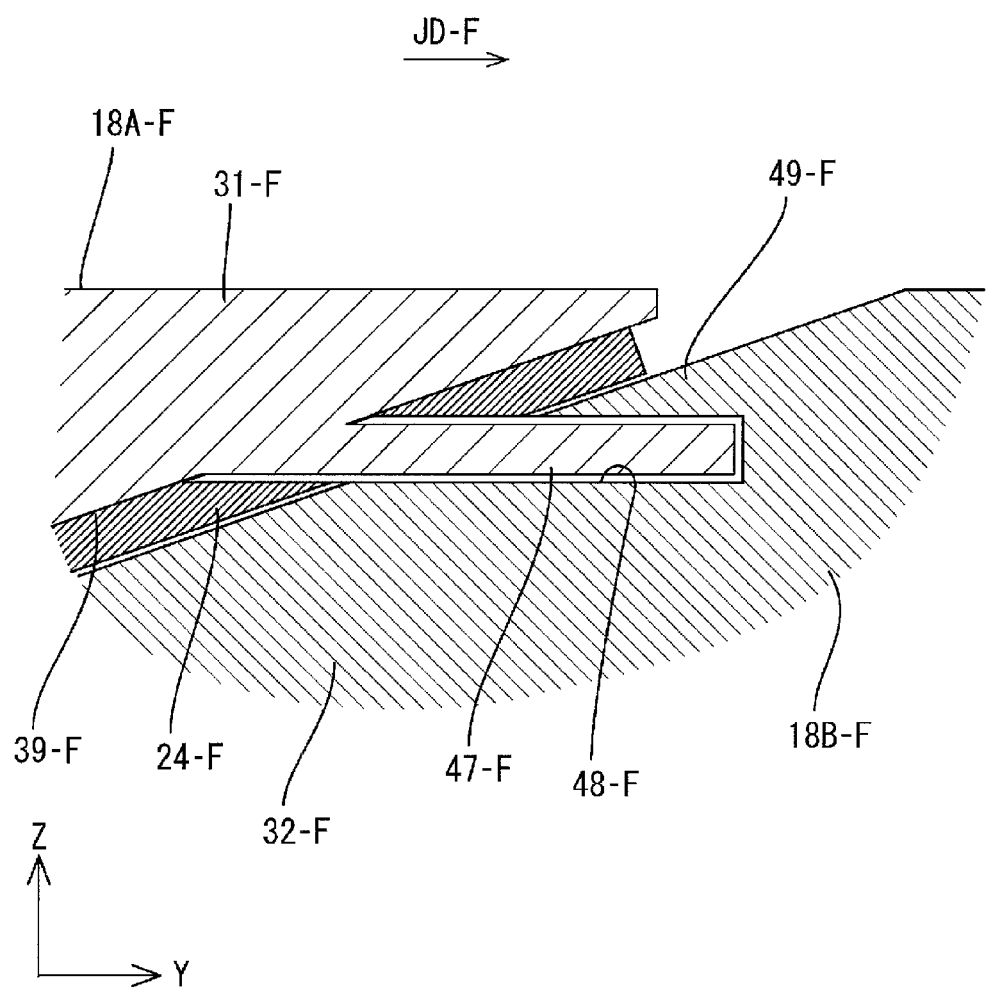
FIG. 21 is a magnified cross-sectional view of a fitting structure according to a seventh embodiment of the present invention.
Figure 22:
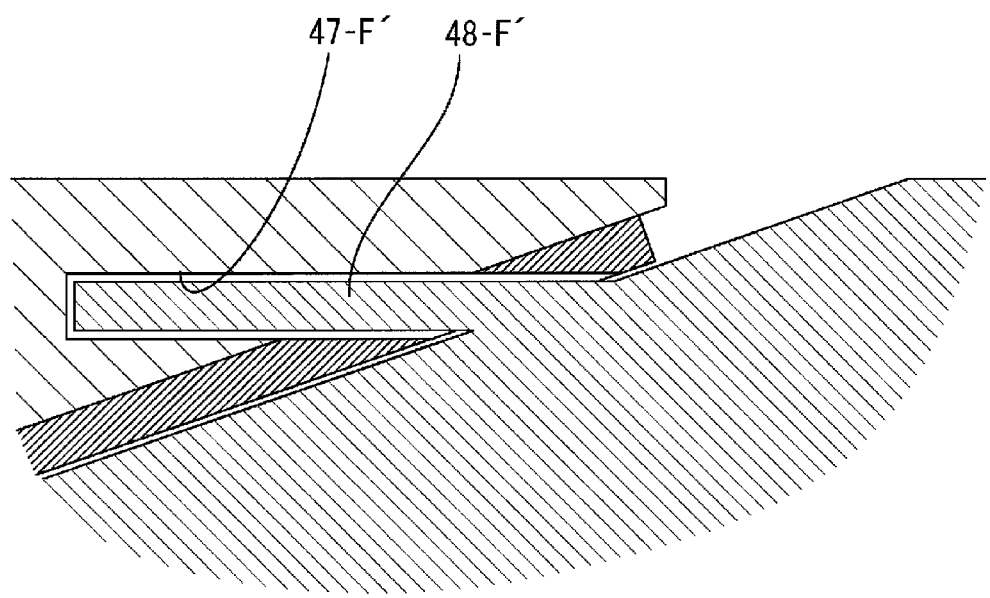
FIG. 22 is a magnified cross-sectional view of a fitting structure according to a modified example of the seventh embodiment.

As illustrated in FIG. 21, a first fitting portion 47-F is formed on a front portion of a light exit portion 31-F of a first light guide plate 18A-F. The first fitting portion 47-F projects substantially straight along the Y-axis direction from a sloped surface 39-F on the rear-surface side of the light exit portion 31-F. A through hole is formed in a reflective sheet 24-F so that the first fitting portion 47-F passes therethrough. The second fitting portion 48-F is formed in a light guide portion 32-F of a second light guide plate 18B-F on the front side. The second fitting portion 48-F is formed in a light guide portion 32-F of the second light guide plate 18B-F that overlaps a light exit portion 31-F of the rear-side first light guide plate 18A-F in the plane view. The second fitting portion 48-F opens rearward and extends substantially straight in the Y-axis direction. A portion of the surrounding part of the second fitting portion 48-F that is provided on the front-surface side of the first fitting portion 47-F is a stopper 49-F. A fitting direction of the first fitting portion 47-F to the second fitting portion 48-F is same as the Y-axis direction as represented by an arrow JD-F in FIG. 21.

As modified examples of the embodiment in FIG. 21, the shapes of the first fitting portion 47-F and the second fitting portion 48-F may be changed. For example, as illustrated in FIG. 22, a first fitting portion 47-F' may be formed in a recess and a second fitting portion 48-F' may be formed in a projection.

Eighth Embodiment

The eighth embodiment of the present invention will be explained with reference to FIG. 23 or FIG. 24. In the eighth embodiment, first fitting portions 47-G and second fitting portions 48-G are formed in different shapes from the seventh embodiment. Similar parts to the seventh embodiment will be indicated by the same symbols followed by -G. The same configurations, functions and effects will not be explained.

Figure 23:
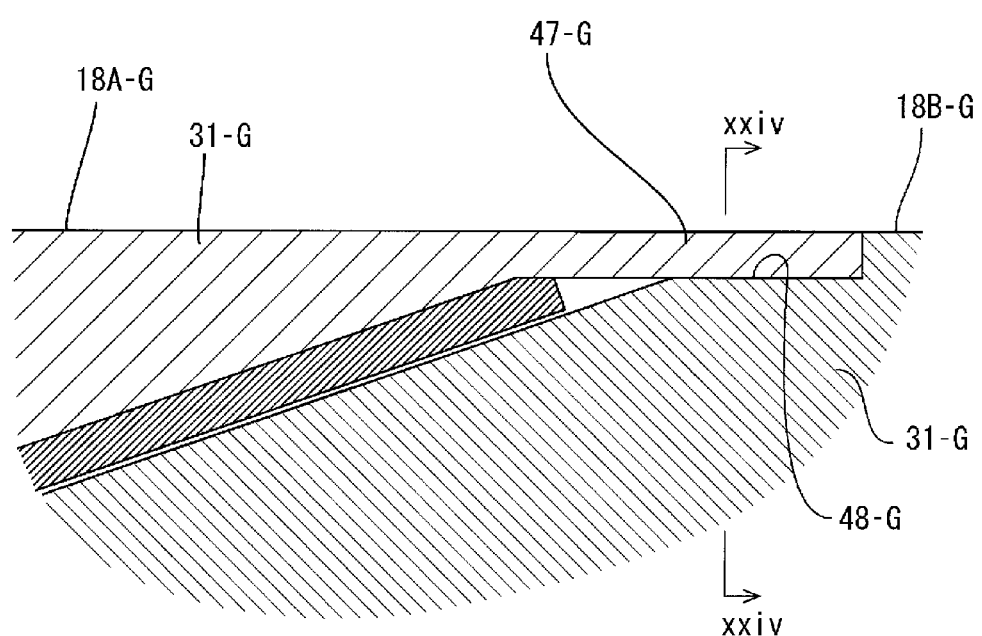
FIG. 23 is a magnified cross-sectional view of a fitting structure according to an eighth embodiment of the present invention.
Figure 24:
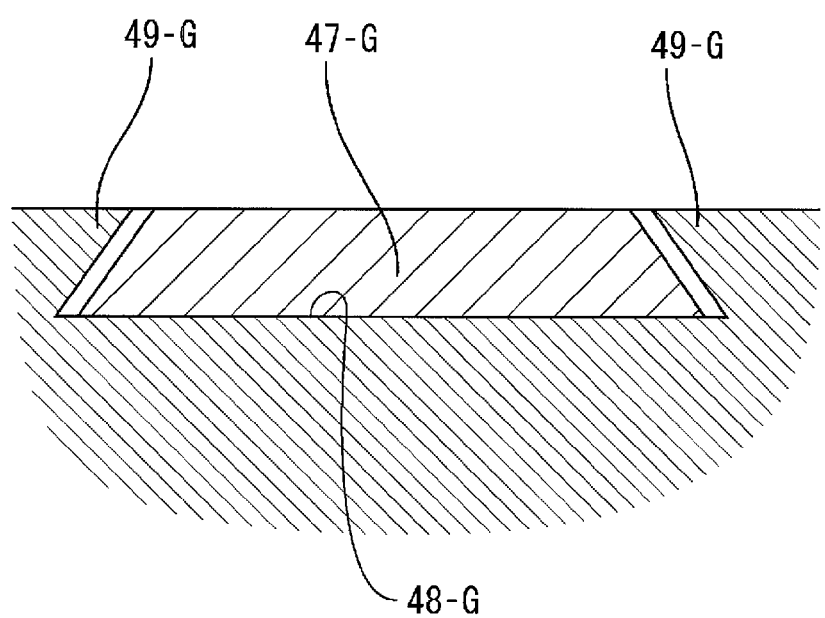
FIG. 24 is a cross-sectional view of FIG. 23 along a xxiv-xxiv line.

As illustrated in FIG. 23, the first fitting portion 47-G is formed to project frontward substantially straight along the Y-axis direction from the front end of a light exit portion 31-G of a first light guide plate 18A-G. The second fitting portion 48-G is formed to open rearward and open to the front-surface side. The second fitting portion 48-G extends substantially straight along the Y-axis direction at the rear end of a light exit portion 31-G of a second light guide plate 18B-G. As illustrated in FIG. 24, each of the first fitting portion 47-G and the second fitting portion 48-G has a trapezoidal cross section cut along the Z-axis direction and the X-axis direction. The second fitting portion 48-G is formed in a dovetail groove. Portions of the surrounding parts of the second fitting portion 48-G that are provided on the front-surface side with respect to either side of the first fitting portion 47-G in the X-axis direction are stoppers 49-G. Accordingly, the first fitting portion 47-G and a light exit portion 31-G of the first light guide plate 18A-G are less likely to move relatively to the front-surface side by the stoppers 49-G that are provided on either side of the second fitting portion 48-G in the X-axis direction.

Ninth Embodiment

The ninth embodiment of the present invention will be explained with reference to FIG. 25. In the ninth embodiment, first fitting portions 47-H and second fitting portions 48-H are formed in different shapes from the seventh embodiment. Similar parts to the first embodiment will be indicated by the same symbols followed by -H. The same configurations, functions and effects will not be explained.

Figure 25:
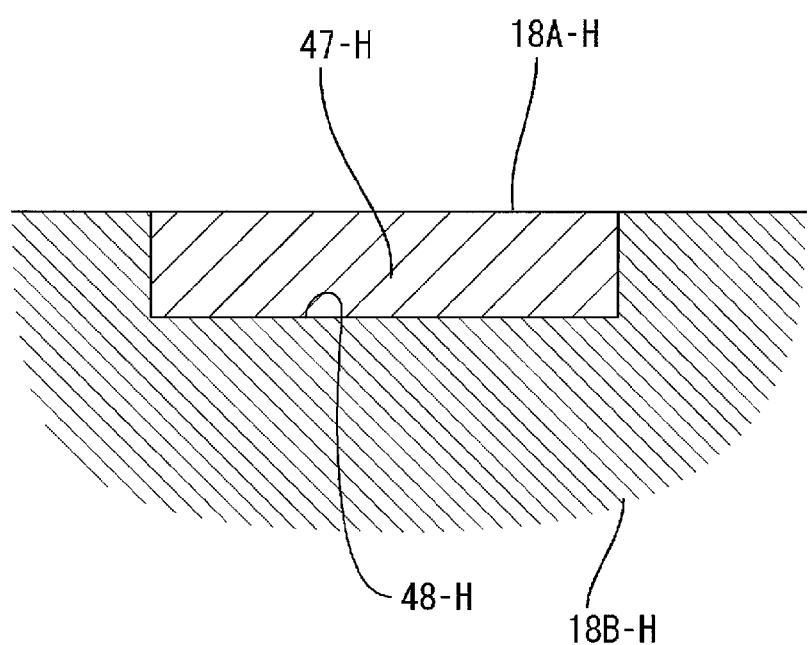
FIG. 25 is a magnified cross-sectional view of the fitting structure according to the eighth embodiment.

As illustrated in FIG. 25, the first fitting portion 47-H and the second fitting portion 48-H have a rectangular cross section cut along the Z-axis direction and the X-axis direction. Therefore, no stopper that is to be provided on the front-surface side with respect to the first fitting portion 47-H is provided on the surrounding parts of the second fitting portion 48-H. However, the second fitting portion 48-H is equal to or smaller than the first fitting portion 47-H in its width (in the X-axis direction). Accordingly, the first fitting portion 47-H is pressed into the second fitting portion 48-H. Because the first fitting portion 47-H is closely fitted to the second fitting portion 48-H, great frictional resistance force is generated between the first fitting portion 47-H and the second fitting portion 48-H. Due to the frictional resistance force, the first fitting portion 47-H and the light exit portion of the first light guide plate 18A-H are less likely to move relatively to the front-surface side with respect to the front-side second light guide plate 18B-H.

As explained above, according to the present embodiment, the first fitting portion 47-H and the second fitting portion 48-H are closely fitted to each other with pressed. Frictional resistance force is generated between the first fitting portion 47-H and the second fitting portion 48-H that are closely fitted to each other with pressed. This frictional resistance force is less likely to cause the relative movement of the light exit portion (the overlapping area) of the first light guide plate 18A-H toward the light output side.

Tenth Embodiment

The tenth embodiment of the present invention will be explained with reference to FIG. 26 or FIG. 27. In the tenth embodiment, first fitting portions 47-I and second fitting portions 48-I are formed in different shapes from the first embodiment. Similar parts to the first embodiment will be indicated by the same symbols followed by -I. The same configurations, functions and effects will not be explained.

Figure 26:
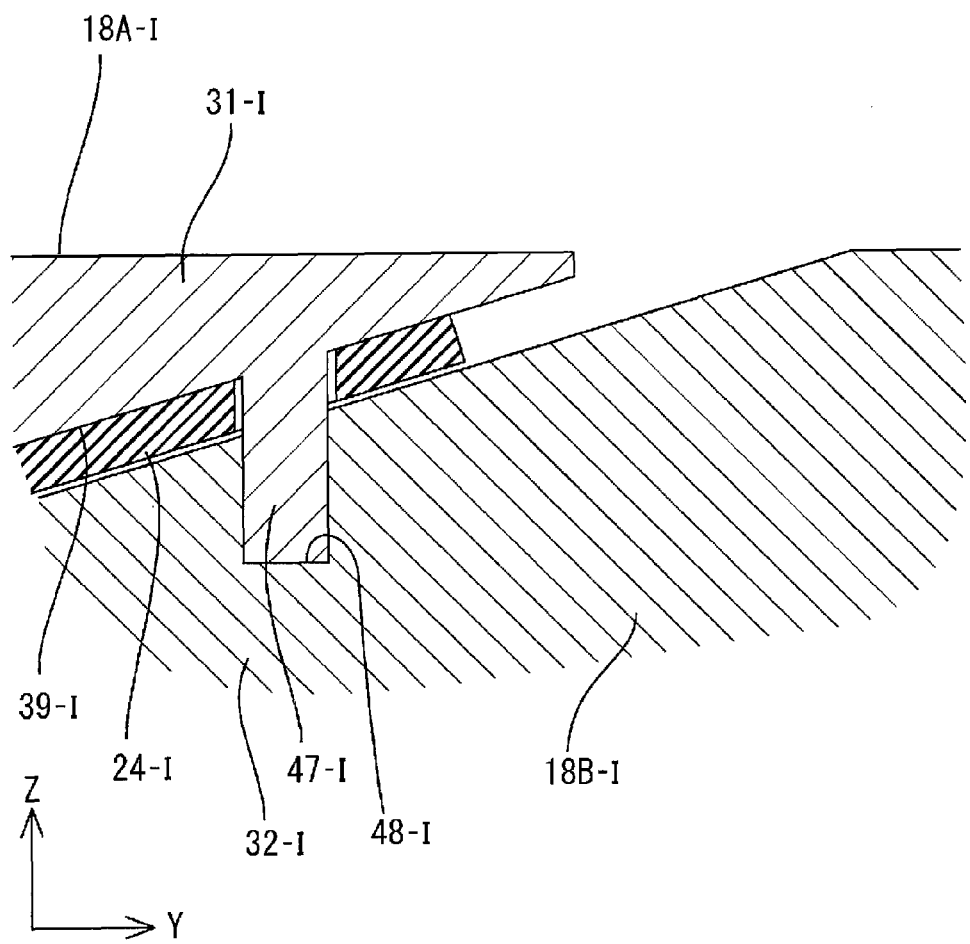
FIG. 26 is a magnified cross-sectional view of a fitting structure according to a tenth embodiment of the present invention.
Figure 27:
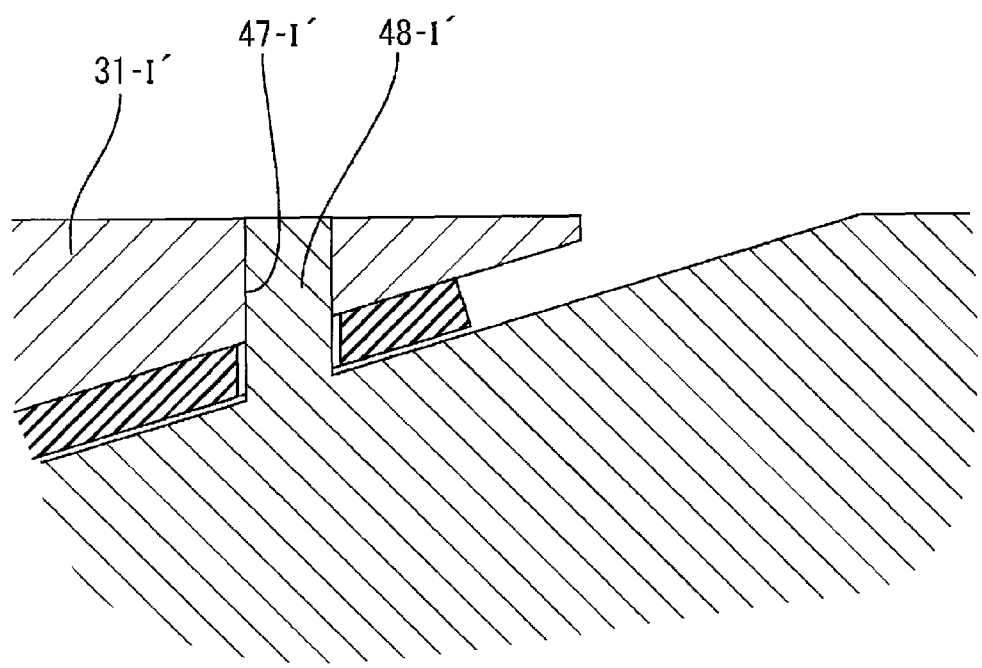
FIG. 27 is a magnified cross-sectional view of the fitting structure according to the tenth embodiment.

As illustrated in FIG. 26, the first fitting portion 47-I is formed on the rear-surface side of the front portion of a light exit portion 31-I of a first light guide plate 18A-I. The first fitting portion 47-I projects substantially straight along the Z-axis direction from the rear-surface side of a sloped surface 39-I toward the rear-surface side (the direction opposite from the light output side). A through hole is formed in a reflective sheet 24-I so that the first fitting portion passes therethrough. The second fitting portion 48-I is provided on a light guide portion 32-I of a second light guide plate 18B-I on the front side. The light guide portion 32-I of the second light guide plate 18B-I overlaps a light exit portion 31-I of a rear-side first light guide plate 18A-I in a plan view. The second fitting portion 48-I is formed to open to the front-surface side and extends substantially straight along the Z-axis direction. An opening area of the second fitting portion 48-I (the size in the X-axis direction and the Y-axis direction) is set to be substantially equal to or smaller than the cross section of the first fitting portion 47-I cut along the X-axis direction and the Y-axis direction. Accordingly, the first fitting portion 47-I is pressed into the second fitting portion 48-I. Because the first fitting portion 47-I is closely fitted to the second fitting portion 48-I, great frictional resistance force is generated between the first fitting portion 47-I and the second fitting portion 48-I. This frictional resistance force is less likely to cause the relative movement of the first fitting portion 47-I and a light exit portion 31-I of a first light guide plate 18A-I toward the front-surface side with respect to a front-side second light guide plate 18B-I.

As a modified example of the embodiment in FIG. 26, the shapes of the first fitting portion 47-I and the second fitting portion 48-I may be changed. For example, as illustrated in FIG. 27, a first fitting portion 47-I' may be formed in a recess and a second fitting portion 48-I' may be formed in a projection. In such a case, the first fitting portion 47-I' may be formed in a through hole running through a light exit portion 31-I'.

Other Embodiments

The present invention is not limited to the above embodiments explained in the above description. The following embodiments may be included in the technical scope of the present invention, for example.

(1) In the first and second embodiments, the first fitting portion may be formed in a recess and the second fitting portion may be formed in a projection. In such a case, the second fitting portion may be provided on a light guide portion of the light guide plate on the relatively front side that overlaps the light exit portion of the rear-side light guide plate. The first fitting portion may be formed to be open to the rear-surface side (the side opposite to the light output side) of the light exit portion. The first fitting portion may be a through hole running through the light exit portion.

(2) In the second embodiment, the arrangement of the stopper projection and the stopper recess may be changed as necessary. For example, the stopper projection may be provided on the rear-surface side of the front end of the first fitting portion, and the stopper recess may be provided on a portion of the surrounding part of the second fitting portion that overlaps the first fitting portion on the rear-surface side (the portion opposing to the stopper). The stopper recess may be provided on the first fitting portion and the stopper projection may be provided on the second fitting portion.

(3) The stopper projection of the third and fourth embodiments may be formed in a different shape as necessary. For example, the stopper projection may be spread only in the X-axis direction from the first fitting portion or the second fitting portion. The stopper projection may be formed in a shape of an umbrella so as to be spread in the X-axis direction and the Y-axis direction from the first fitting portion and the second fitting portion.

(4) As a modification of the fifth and sixth embodiments, the position and the number of the fitting structure may be changed as necessary.

(5) As a modification of the above-descried embodiments, the arrangement of the fitting structure in the Y-axis direction may be changed as necessary. The first fitting portion is not necessarily provided on the front end or the front side portion of the light exit portion but may be provided on the middle portion in the Y-axis direction. The first fitting portion has a predetermined effect if it is provided on a portion that overlaps the adjacent light guide plate on the front side. Therefore, the first fitting portion may be provided freely on the front-side portion of the light exit portion and the light guide plate that is an overlapping area. The second fitting portion may be also provided in any other position so as to correspond to the position of the first fitting portion.

(6) In the above embodiment, each light guide plate has a single slit so as to have two divided light exit portions and two divided light guide portions (light entrance surfaces). However, each light guide plate may have two or more slits so as to have three or more divided light exit portions and three or more light guide portions (light entrance surfaces). With such a configuration, a single light guide plates can collectively cover three or more LEDs. This makes assembly of the backlight unit easier. The light guide plates are preferably fixed with fixing members such as clips such that the LEDs are collectively located between a pair of the fixing members.

(7) In the above embodiments, the light exit portion and the light guide portion of each light guide plate are divided by the slit so as to cover multiple LEDs. That is, a single light guide plate covers multiple LEDs. However, light guide plates without slits and configured to cover respective LEDs (i.e., each having a single light entrance surface) may be used. With such light guide plates, light emitted from an adjacent LED that is not a target LED to cover does not enter a target light guide plate. Therefore, each light guide plate can be optically independent from another. The light guide plates are preferably fixed with fixing members such as clips such that the LEDs are collectively located between a pair of the fixing members.

(8) In the above embodiment, each light guide plate has a rectangular shape in a plan view. However, each light guide plate may have a square shape in a plan view. The lengths, the widths, the thicknesses and the outer surface shapes of each board mounting portion, each light guide portion and each light exit portion can be altered as necessary.

(9) In the above embodiment, each LED emits light upward in the vertical direction. However, the light emitting direction of each LED can be altered as necessary. Namely, each LED can be mounted to the LED board in a suitable position. Specifically, each LED can be mounted to the LED board so as to emit light downward in the vertical direction, or such that the light emitting direction (the light axis) aligned with the horizontal direction. The LEDs with different light emitting directions may be included.

(10) In the above embodiments, the light guide plates are arranged so as to overlap each other in a plan view. However, the light guide plates may be arranged so as not to overlap each other in a plan view. In such a case, the scattering structure is preferably formed not only in each light exit portion but also side-edge surfaces of each light guide portion and each board mounting portion. It is further preferable to be formed in the entire peripheral surface of the light guide plate.

(11) In the above embodiments, the LEDs and the light guide plates (unit light emitters) are two-dimensionally arranged parallel to each other inside the chassis. However, they may be one-dimensionally arranged parallel to each other. Specifically, the LEDs and the light guide plates are arranged parallel to each other in only in the vertical direction, or they are arranged parallel to each other only in the horizontal direction.

(12) In the above embodiment, each LED includes three different LED chips configured to emit respective colors of RGB. However, LEDs each including a single LED chip configured to emit a single color of blue or violet and each configured to emit white light using fluorescent material may be used.

(13) In the above embodiment, each LED includes three different LED chips configured to emit respective colors of RGB. However, LEDs each including three different LED chips configured to emit respective colors of cyan (C), magenta (M) and yellow (Y) or white LEDs may be used.

(14) In the above embodiment, the LEDs are used as point light sources. However, point light sources other than LEDs can be used.

(15) In the above embodiment, the point light sources are used as light sources. However, linear light sources such as cold cathode tubes and hot cathode tubes may be used.

(16) Planar light sources such as organic ELs may be used other than the above embodiments, (14) and (15).

(17) The optical member may be configured differently from the above embodiments. Specifically, the number of diffusers or the number and the kind of the optical sheets can be altered as necessary. Furthermore, a plurality of optical sheets in the same kind may be used.

(18) In the above embodiment, the liquid crystal panel and the chassis are held in the vertical position with the long-side direction thereof aligned with the vertical direction. However, the liquid crystal panel and the chassis may be held in the vertical position with the long-side direction thereof aligned with the vertical direction.

(19) In the above embodiment, TFTs are used as switching components of the liquid crystal display device. However, the technology described the above can be applied to liquid crystal display devices including switching components other than TFTs (e.g., thin film diode (TFD)). Moreover, the technology can be applied to not only color liquid crystal display devices but also black-and-white liquid crystal display devices.

(20) In the above embodiments, the liquid crystal display device including the liquid crystal panel as a display component is used. The technology can be applied to display devices including other types of display components.

(21) In the above embodiments, the television receiver including the tuner is used. However, the technology can be applied to a display device without a tuner.

The invention claimed is:
1. A lighting device comprising:
at least one light source;
a first light guide member and a second light guide member, each of the first and second light guide members including a light entrance surface disposed so as to face the light source and through which light from the light source enters and a light exit surface through which the light exits, the light exit surface being disposed parallel to an arrangement direction in which the light source and the light entrance surface are arranged, the first light guide member and the second light guide member being arranged parallel to each other in the arrangement direction and partially overlapping each other in a direction perpendicular to the light exit surface, the first light guide member being arranged on a relatively light output side and the second light guide member being arranged on a side opposite from the relatively light output side; and
a fitting structure provided on each of the first light guide member and the second light guide member, the fitting structure configured to restrict relative movement of an overlapping area of the first light guide plate toward the light output side with respect to the second light guide member.

2. The lighting device according to claim 1, wherein the fitting structure includes a first fitting portion and a second fitting portion, the first fitting portion provided on the overlapping area of the first light guide member and the second fitting portion provided on the second light guide member and configured to be fitted to the first fitting portion.

3. The lighting device according to claim 2, wherein the second fitting portion includes a stopper configured to be provided on the light output side with respect to the first fitting portion and to be fitted to the first fitting portion.

4. The lighting device according to claim 3, wherein:
 a fitting direction of the first fitting portion and the second fitting portion crosses the light exit surface; and
 the first fitting portion and the second fitting portion include a retaining structure that restricts relative movement of the first fitting portion and the second fitting portion in a direction opposite to the fitting direction by fitting of the first fitting portion and the second fitting portion.

5. The lighting device according to claim 4, wherein the fitting direction of the first fitting portion and the second fitting portion crosses the light exit surface and the stopper is the retaining structure.

6. The lighting device according to claim 3, wherein a gap is provided between the first fitting portion and the second fitting portion.

7. The lighting device according to claim 2, wherein the first fitting portion and the second fitting portion are closely fitted to each other with being pressed.

8. The lighting device according to claim 2, wherein:
 a fixing member is provided on a non-overlapping area of the first light guide member that does not overlap the second light guide member, the fixing member configured to fix the first light guide member to a base member; and
 the non-overlapping area fixed by the fixing member and the overlapping area including the first fitting portion are arranged parallel to each other in the arrangement direction in which the light source and the light entrance surface are arranged.

9. The lighting device according to claim 8, wherein the first fitting portion is provided at a distal end of the overlapping area in the arrangement direction in which the light source and the light entrance surface are arranged.

10. The lighting device according to claim 2, wherein each of the first light guide member and the second light guide member includes the first fitting portion and the second fitting portion and the first light guide member includes a plurality of first light guide members and the second light guide member includes a plurality of second light guide members and the first light guide members and the second light guide members are arranged in parallel to each other in the arrangement direction in which the light source and the light entrance surface are arranged.

11. The lighting device according to claim 2, wherein:
 the overlapping area of the first light guide member includes the light exit surface; and
 the first fitting portion and the second fitting portion overlap each other on a side opposite from the light exit surface with respect to the overlapping area of the first light guide member.

12. The lighting device according to claim 1, wherein the fitting structure is provided on an end of the first light guide member and the second light guide member in a direction crossing the arrangement direction and parallel to the light exit surface.

13. The lighting device according to claim 12, wherein a pair of fitting structures is provided on either end of the first light guide member and the second light guide member in the direction crossing the arrangement direction and parallel to the light exit surface.

14. The lighting device according to claim 1, wherein the first light guide plate includes a plurality of first light guide plates and the second light guide plate includes a plurality of second light guide plates and the first light guide plates and the second light guide plates are arranged parallel to each other in a direction parallel to the light exit surface and crossing the arrangement direction.

15. A display device comprising:
 the lighting device according to claim 1; and
 a display panel configured to provide display using light from the lighting device.

16. The display device according to claim 15, wherein the display panel is a liquid crystal panel including liquid crystals sealed between a pair of substrates.

17. A television receiver comprising the display device according to claim 15.

* * * * *